(12) United States Patent
Minagawa et al.

(10) Patent No.: US 7,291,080 B2
(45) Date of Patent: Nov. 6, 2007

(54) HYBRID TRANSMISSION

(75) Inventors: Yuusuke Minagawa, Kanagawa (JP); Toshikazu Oshidari, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 251 days.

(21) Appl. No.: 11/228,018

(22) Filed: Sep. 16, 2005

(65) Prior Publication Data
US 2006/0063629 A1 Mar. 23, 2006

(30) Foreign Application Priority Data
Sep. 17, 2004 (JP) ............................ 2004-271535

(51) Int. Cl.
*F16H 3/72* (2006.01)
(52) U.S. Cl. ........................................................ 475/5
(58) Field of Classification Search .................... 475/5, 475/6
See application file for complete search history.

(56) References Cited

U.S. PATENT DOCUMENTS

| | | | | |
|---|---|---|---|---|
| 6,953,409 B2 * | 10/2005 | Schmidt et al. | ................. | 475/5 |
| 7,059,986 B2 * | 6/2006 | Schmidt | ......................... | 475/5 |
| 7,207,915 B2 * | 4/2007 | Oshidari et al. | ................ | 475/5 |
| 2003/0104892 A1 | 6/2003 | Porter | | |

FOREIGN PATENT DOCUMENTS

| | | |
|---|---|---|
| EP | 1 564 056 A2 | 8/2005 |
| JP | 11-332019 A | 11/1999 |
| WO | WO 2005/066517 A1 | 7/2005 |

* cited by examiner

*Primary Examiner*—Ha D. Ho
(74) *Attorney, Agent, or Firm*—Foley & Lardner LLP

(57) ABSTRACT

A hybrid transmission includes first and second differential devices each including first, second and third rotating elements. An input element clutch is arranged to selectively connect the first rotating element of the first differential device and the first rotating element of the second differential device. An input member is arranged to connect an engine with the first rotating element of the second differential device. A first output member is connected with one of the first rotating elements of the first and second differential devices. A second output member is connected the second rotating element of the second differential device. A first motor/generator is connected with the second rotating element of the first differential device. A second motor/generator is connected with the third rotating element of the first differential device. One of a connecting state, a disconnect state, a reverse enable state and a unitary rotatable state is selectively selected by a select device.

16 Claims, 17 Drawing Sheets

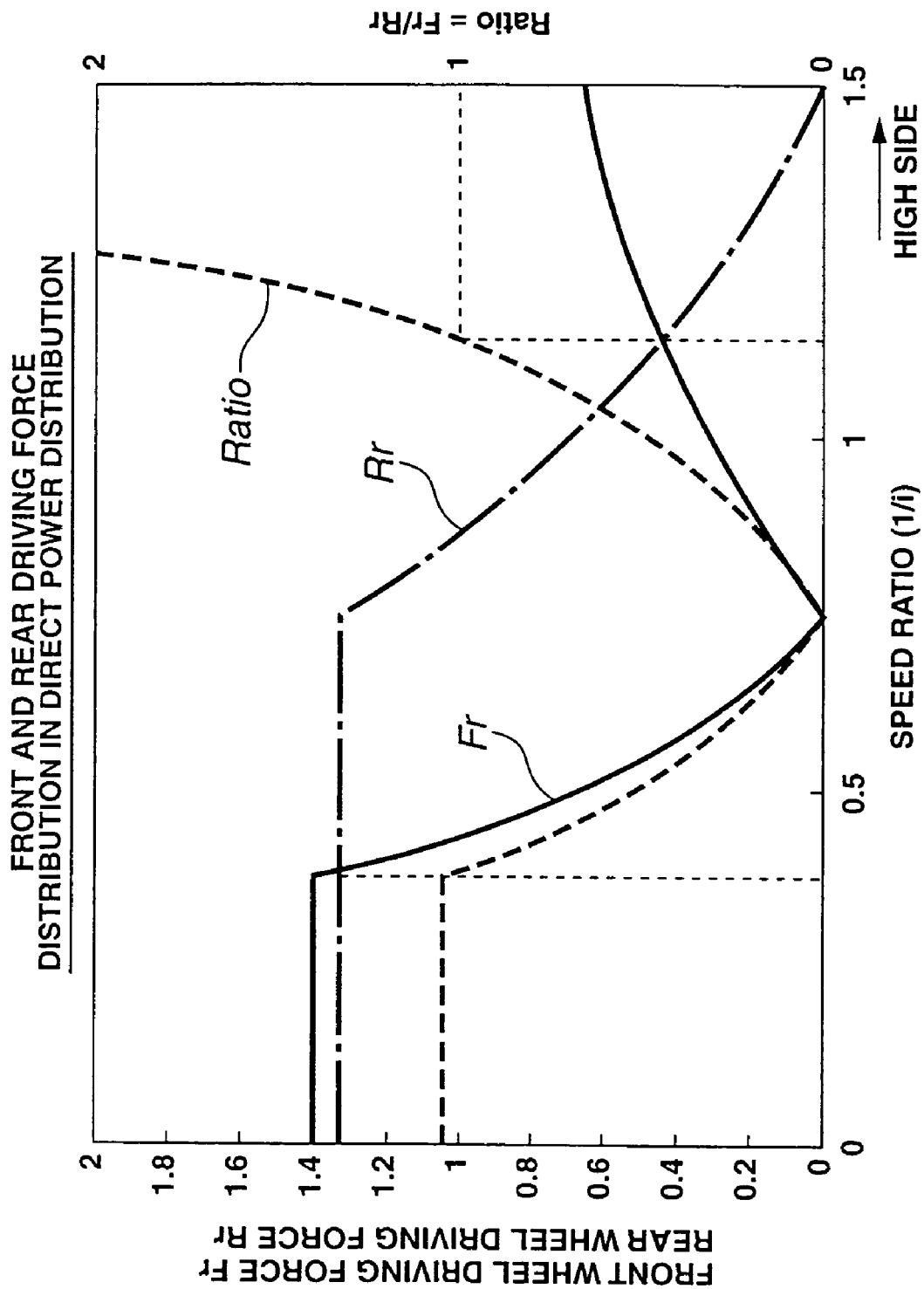
FIG.21 FRONT AND REAR DRIVING FORCE DISTRIBUTION IN DIRECT POWER DISTRIBUTION

HYBRID TRANSMISSION

BACKGROUND OF THE INVENTION

The present invention relates to a hybrid transmission applicable to a hybrid vehicle using an engine and a motor/generator. More specifically, the present invention relates to a hybrid transmission which is capable of varying a transmission ratio continuously with a differential system connected between the engine and the motor/generator and which is applicable to a four wheel drive system.

A published Japanese patent application H11(1999)-332019 shows a hybrid system for driving the four wheels of a vehicle. This hybrid system have a hybrid transmission including a motor, and an additional motor provided for the wheels not driven by the hybrid transmission.

SUMMARY OF THE INVENTION

In this hybrid system, however, the need for the additional motor is disadvantageous to the cost. Moreover, this system requires a newly designed vehicle body floor for providing space for the additional motor and an inverter. The hybrid transmission and the additional motor are connected with the main drive wheels (front wheels) and the secondary drive wheels (rear wheels), respectively and separately. Therefore, the flexibility in design is low and the degrees of freedom is low in the front and rear wheel driving force distribution.

It is an object of the present invention to provide a hybrid transmission for providing two driving forces.

According to one aspect of the present invention, a hybrid transmission comprises: (1) first and second differential devices each including first, second and third rotating elements so arranged that a rotating condition of one of the rotating elements is determined if the rotating conditions of the other two elements are determined; (2) an input element clutch connecting the first rotating element of the first differential device and the first rotating element of the second differential device; (3) an input member adapted to be connected with an engine and connected with the first rotating element of the second differential device; (4) a first output member connected with a first output element which is one of the first rotating elements of the first and second differential devices; (5) a second output member connected with a second output element which is the second rotating element of the second differential device; (6) a first motor/generator connected with the second rotating element of the first differential device; (7) a second motor/generator connected with the third rotating element of the first differential device; and (8) a select device arranged to put a connecting state between the third rotating element of the first differential device and the third rotating element of the second differential device, selectively in one of a disconnect state, a reverse enable state and a unitary rotatable state.

According to another aspect of the invention, a hybrid transmission comprises: (1) a first planetary gear set including a first sun gear, a first planet carrier and a first ring gear; (2) a second planetary gear set including a second sun gear, a second planet carrier and a second ring gear; (3) an input element clutch connecting the first carrier and the second ring gear; (4) an input shaft adapted to be connected with an engine and connected with the second ring gear; (5) a first output shaft which is adapted to be connected with first drive wheels of a vehicle and which is connected with one of the first carrier ad the second ring gear; (6) a second output shaft which is adapted to be connected with second drive wheels of the vehicle and which is connected with the second carrier; (7) an electric rotary machine including a first rotor which forms a first motor/generator and which is connected with the first ring gear, and a second rotor which forms a second motor/generator and which is connected with the first sun gear; (8) a third planetary gear set including a third sun gear connected with the second sun gear, a third ring gear connected with the first sun gear, and a third planet carrier; (9) a high clutch arranged to connect the third sun gear and the third ring gear selectively; and (10) a low brake arranged to hold the third carrier selectively.

According to still another aspect of the present invention, a hybrid transmission comprises: (1) a first differential device including first, second and third rotating elements so arranged that a rotating condition of one of the rotating elements is determined if the rotating conditions of the other two elements are determined; (2) a second differential device including first, second and third rotating elements so arranged that a rotating condition of one of the rotating elements is determined if the rotating conditions of the other two elements are determined; (3) first selective engaging means for connecting the first rotating element of the first differential device and the first rotating element of the second differential device; (4) input means for inputting an input rotation to the first rotating element of the second differential device; (5) first output means for taking out a first output of the hybrid transmission from a first output element which is one of the first rotating elements of the first and second differential devices; (6) second output means for taking out a second output of the hybrid transmission from the second rotating element of the second differential device; (7) first electric means for converting electric energy into mechanical energy to drive the second rotating element of the first differential device and for converting mechanical energy from the second rotating element of the first differential device into electric energy; (8) second electric means for converting electric energy into mechanical energy to drive the third rotating element of the first differential device, and for converting mechanical energy of the third rotating element of the first differential device into electric energy; and (9) selecting means for putting a connecting state between the third rotating element of the first differential device and the third rotating element of the second differential device, selectively in one of a disconnect state, a reverse enable state and a unitary rotatable state.

BRIEF DESCRIPTION OF THE DRAWINGS

FIG. 21 is a diagram showing variation characteristics of the front wheel driving force, the rear wheel driving force, and the ratio between the front wheel driving force and the rear wheel driving force, in the hybrid transmission of FIG. 2, with respect to a speed ratio which is equal to the reciprocal of the gear ratio.

DETAILED DESCRIPTION OF THE INVENTION

Figure 1:
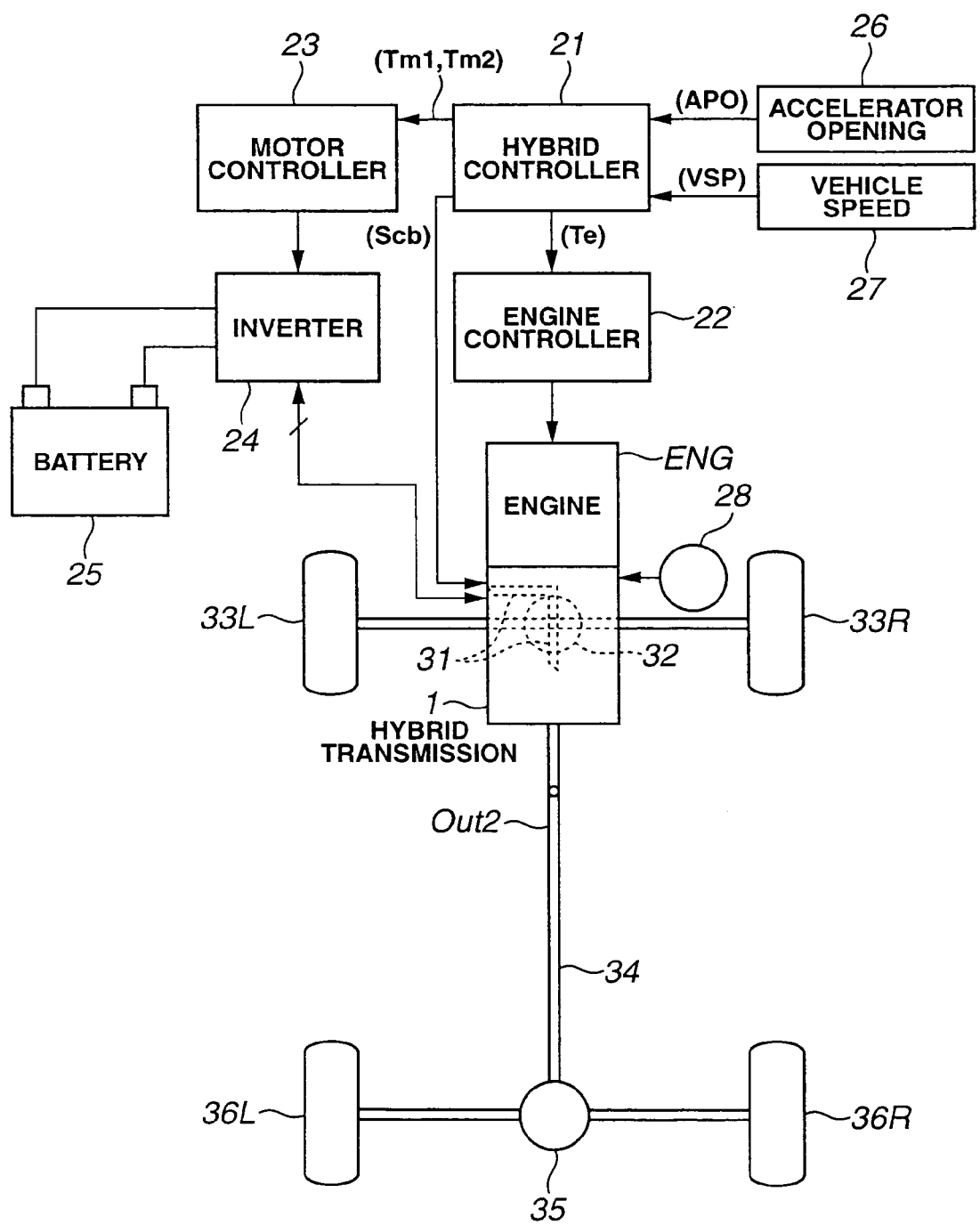
FIG. 1 is a schematic view showing a vehicle equipped with a hybrid transmission and a control system for the hybrid transmission, according to one embodiment of the present invention.

FIG. 1 schematically shows a vehicle equipped with a hybrid control system according to one embodiment of the present invention. In this embodiment, a hybrid transmission 1 has a construction, as shown in FIG. 2, suitable for use as a transmission for a rear wheel drive vehicle (FR vehicle).

Figure 2:
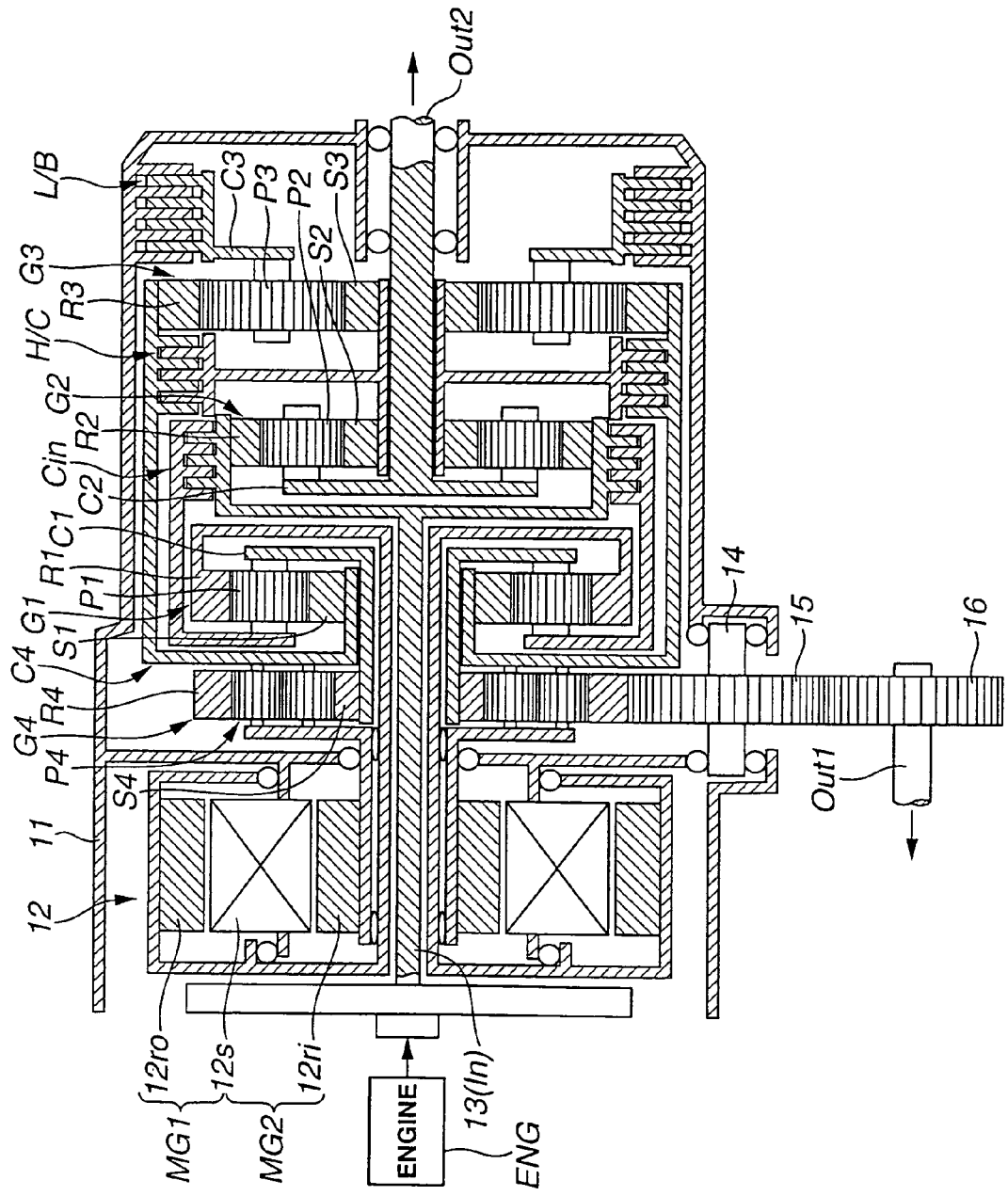
FIG. 2 is a schematic exploded sectional view showing the hybrid transmission shown in FIG. 1.

In a transmission case 11, there are provided first, second, third and fourth planetary gear sets G1, G2, G3 and G4 which are arranged coaxially in an axial line or common axis extending in a left and right direction as viewed in FIG. 2.

The four planetary gear sets are arranged along the axial line from the left side in the order of G4, G1, G2 and G3. Fourth planetary gear set G4 is located at an axial position closest to an engine ENG on the left side as viewed in FIG. 2. Third planetary gear set G3 is remotest from engine ENG. First planetary gear set G1 is located axially between G4 and G2. Second planetary gear set G2 is located axially between G1 and G3.

Each of first, second and third planetary gear sets G1, G2 and G3 is a simple planetary gear set composed of a sun gear S1, S2 or S3, a ring gear R1, R2 or R3, and a planet carrier C1, C2 or C3 rotatably supporting pinions P1, P2 or P3 engaging between the sun gear and ring gear. Fourth planetary gear set G4 is a complex gear set having pinion sets P4. In this example, fourth planetary gear set G4 is a double pinion planetary gear set composed of a fourth sun gear S4, a fourth ring gear R4 and a fourth planet carrier C4 rotatably supporting first pinions each engaging with fourth sun gear S4, and second pinions each engaging with fourth ring gear R4, and one of the first pinions. Each of first, second, third and fourth planetary gear sets G1. G2, G3 and G4 is a (first, second, third or fourth) speed differential device having two degrees of freedom which has three rotating active elements (sun gear, ring gear and planet carrier), and which is arranged so that the rotating condition of one element is determined if the rotating conditions of the remaining two elements are determined.

A motor/generator set is arranged coaxially with planetary gear sets G1-G4 within transmission case 11 near a front end of transmission case on the left side as viewed in FIG. 2. The motor/generator set is located axially between engine ENG and fourth planetary gear set G4. In this example, the motor/generator set is a compound current twin rotor motor or rotary electric machine 12 including an inner rotor 12$ri$, an annular outer rotor 12$ro$ surrounding inner rotor 12$ri$, and an annular stator 12$s$ disposed between inner and outer rotor 12$ri$ and 12$ro$ so as to form a coaxial arrangement. Inner and outer rotors 12$ri$ and 12$ro$ are supported rotatably and coaxially in transmission case 11. Annular stator 12$s$ is supported stationary to transmission case 11. Stator 12$s$ and outer rotor 12$ro$ form a first motor/generator MG1. Stator 12$s$ and inner rotor 12$ri$ form a second motor/generator MG2. First and second motor/generators MG1 and MG2 can function as motors for producing rotations in respective directions and speeds (including stoppage) when a compound current is supplied with the motor side as a load. First and second motor/generators MG1 and MG2 can function as a generator for producing electric power by utilizing an external force.

An input element clutch (or input clutch) Cin is disposed between first carrier C1 of first planetary gear set G1 (serving as a first rotating element of the first differential device in this example) and second ring gear R2 of second planetary gear set G2 (serving as a first rotating element of the second differential device in this example). Input clutch Cin can make and break the connection between C1 and R2. Second ring gear R2 of second planetary gear set G2 is connected with an input member 13 which, in this example, is in the form of an input shaft. Input shaft 13 is adapted to receive rotation from engine ENG. (In a lever diagram of FIG. 3, input shaft 13 is denoted as In.)

A first output member Out1 in the form of a shaft is connected with a first output element which is one of first carrier C1 of first planetary gear set G1 and second ring gear R2 of second planetary gear set G2 which are connected through input clutch Cin. In the illustrated embodiment, first output shaft Out1 is connected with first carrier C1 through a parallel gear set formed by fourth planetary gear set G4, a gear 15 on a counter shaft 14 and a gear 16 on the first output shaft Out1. Gear 15 on counter shaft 14 is engaged with ring gear R4 of fourth planetary gear set G4, and further engaged with gear 16 of first output shaft Out1. Carrier C1 of first planetary gear set G1 is connected with sun gear S4 of fourth planetary gear set G4. Thus, transmission output rotation is take out sideways through counter shaft 14 disposed in parallel to the transmission main (common) axis on which planetary gear sets G1-G4 are disposed, and first output shaft Out1 parallel to the transmission main axis.

A second output member Out2 in the form of a shaft is connected with carrier C2 of second planetary gear set G2 (by a radially extending connecting portion located axially between G1 and G2). Second output shaft Out2 is aligned with input shaft 13. Second output shaft Out2 projects outward from the rear end of transmission case 11 on the right side as viewed in FIG. 2. In this example, carrier C2 serves as the second rotating element of the second differential device, and as a second output element connected with second output member Out2.

First motor/generator MG1 (outer rotor 12ro, to be exact) is connected with ring gear R1 of first planetary gear set G1 which serves as the second rotating element of the first differential device. Second motor/generator MG1 (inner rotor 12ri, to be exact) is connected, through carrier C4 of fourth planetary gear set G4, with sun gear S1 of first planetary gear set G1 which serves as the third rotating element of the first differential device.

Third planetary gear set G3 together with a low brake L/B and a high clutch H/C serve as a select device or select mechanism for putting a connecting state between sun gear S1 of first planetary gear set G1 (serving as the third rotating element of the first differential device) and sun gear S2 of second planetary gear set G2 (serving as the third rotating element of the second differential device) selectively in one of a disconnect (neutral) state, a reverse enable state and a unitary rotatable (direct drive) state. To this end, sun gear S2 of second planetary gear set G2 is connected with sun gear S3 of third planetary gear set G3. Low brake L/B is disposed between transmission case 11 and carrier C3 of third planetary gear set G3, and arranged selectively to hold the carrier C3 to achieve the reverse enable state. High clutch H/C is disposed between ring gear R3 and sun gear S3 of third planetary gear set G3, and arranged to connect ring gear R3 and sun gear S3 directly to achieve the unitary rotatable (direct drive) state. The disconnect state or neutral state can be achieved by disengaging low/brake L/B and high clutch H/C both.

The thus-constructed hybrid transmission 1 is disposed longitudinally in an engine compartment of the vehicle, behind engine ENG, coaxially with engine ENG. First output shaft Out1 is drivingly connected, through bevel gears 31 and a differential gear unit 32, with left and right front wheels 33L and 33R, as shown in FIG. 1. Second output shaft Out2 projects rearwards, as shown in FIG. 1. Second output shaft Out2 is drivingly connected, through a propeller shaft 34 extending in a longitudinal direction of the vehicle, toward the rear, and a rear differential gear unit 35, with left and right rear wheels 36L and 36R.

FIG. 1 shows a control system for engine ENG and hybrid transmission 1. A hybrid controller 21 performs an integrated control for engine ENG and hybrid transmission 1 (MG1, MG2). Hybrid controller 21 sends a command regarding an engine torque Te for engine ENG, to an engine controller 22. In response to this engine torque command, engine controller 22 controls engine ENG so as to achieve the command torque Te.

Moreover, hybrid controller 21 sends commands regarding motor torques Tm1 and Tm2 for first and second motor/generators MG1 and MG2, to a motor controller 23. In response to these motor torque commands, motor controller 23 controls the motor/generators MG1 and MG2, respectively, so as to achieve the command motor torques Tm1 and Tm2, with an inverter 24 and a battery 25. Furthermore, hybrid controller 21 sends, to hybrid transmission 1, command signals Scb to control the engagement and disengagement of the selective engaging devices including clutches Cin and H/C and brake L/B. In response to these signals Scb, hybrid transmission 1 controls clutches Cin and H/C and brake L/B in engaged or disengaged state by using an oil pressure supplied from an oil pressure source 28.

For various control operations, hybrid controller 21 receives information from various sensors. In this example, an accelerator opening (or position) sensor 26 senses an accelerator pedal depression quantity (accelerator opening) APO, and sends a signal representing APO, to hybrid controller 21. A vehicle speed sensor 27 senses a vehicle speed VSP of the vehicle, and sends, to hybrid controller 21, a signal representing vehicle speed VSP (proportional to an output revolution speed No).

Figure 3:
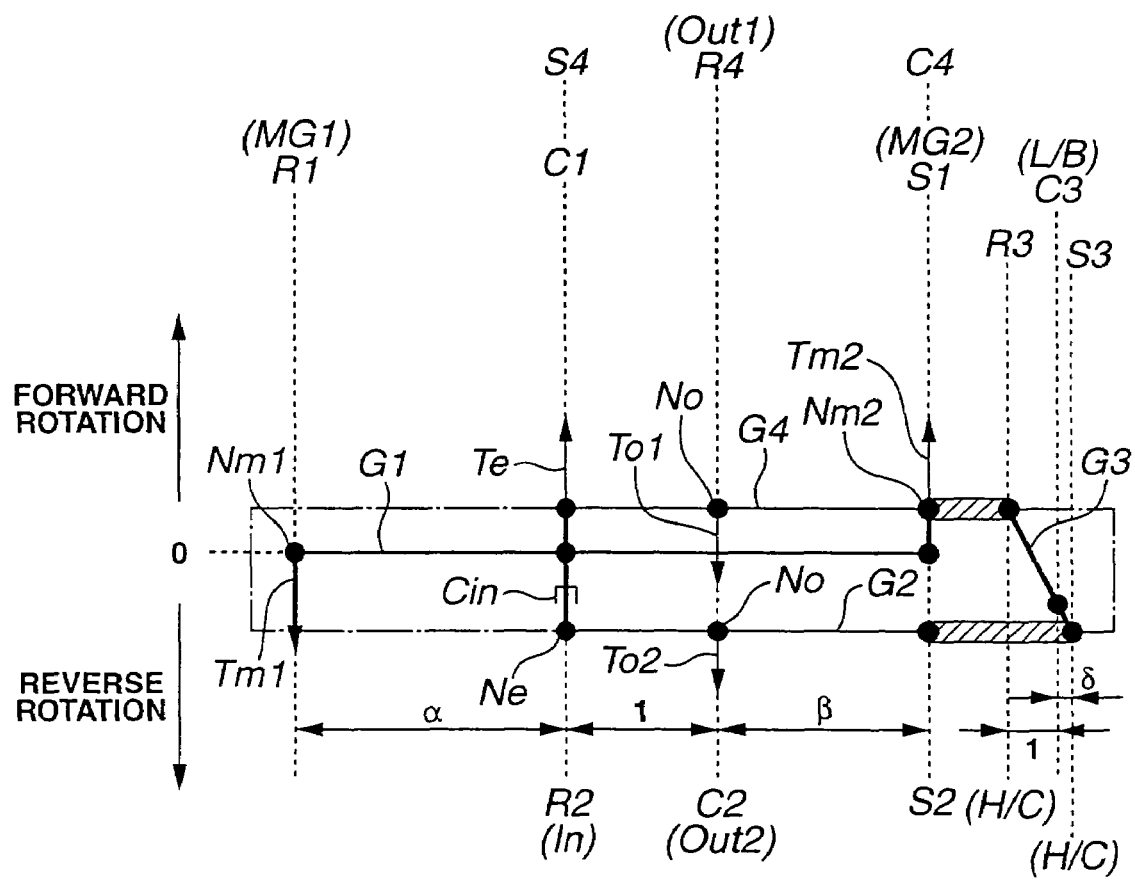
FIG. 3 is a lever diagram of the hybrid transmission of FIG. 2 in a high mode select state.

FIG. 3 shows a lever diagram (or nomograph) of the hybrid transmission constructed as shown in FIG. 2. The order of speeds of the active rotating elements in first planetary gear set G1 is: ring gear R1, carrier C1, sun gear S1. The order of speeds of the active rotating elements in second planetary gear set G2 is: ring gear R2, carrier C2, sun gear S2. The order of speeds of the active rotating elements in third planetary gear set G3 is: ring gear R3, carrier C3, sun gear S3. The order of speeds of the active rotating elements in fourth planetary gear set G4 is: sun gear S4, ring gear R4, carrier C4.

As shown in FIG. 2, first carrier C1 and second ring gear R2 are connected through input element clutch Cin. Second ring gear R2 is connected with input shaft IN for receiving rotation from engine ENG. First carrier C1 is connected with fourth sun gear S4. Fourth ring gear R4 and second carrier C2 are connected, respectively, with first and second output shafts Out1 and Out2.

First ring gear R1 is connected with first motor/generator MG1 (outer rotor 12ro). First sun gear S1 is connected, through fourth carrier C4, with second motor/generator MG2 (inner rotor 12ri). In order to select, with third planetary gear set G3, as the connecting state between first and second sun gears S1 and S2, one of the disconnect state in which first and second sun gears S1 and S2 are disconnected from each other, the reverse enable state enabling such a shift as to bring the speeds of first and second sun gears S1 and S2 closer to each other (or to reduce the speed difference), or enabling such a shift as to separate the speeds from each other (or to increase the speed difference), and the unitary rotatable state in which first and second sun gears S1 and S2 rotate as a unit; first and second sun gears S1 and S2 are connected, respectively, with third ring gear R3 and third sun gear S3; the low brake L/B is arranged to hold third carrier C3 stationary to stationary casing; and the high clutch H/C is arranged to selectively connect third ring gear R3 and third sun gear S3 directly. First and second sun gears S1 and S2 are disconnected and put in the disconnect state by disengaging low brake L/B and high clutch H/C. First and second sun gears S1 and S2 are put in the reverse enable state by engaging low brake L/B and disengaging high clutch H/C. First and second sun gears S1 and S2 are put in the unitary rotatable state for rotation as a unit, by disengaging low brake L/B and engaging high clutch H/C.

In FIG. 3, the horizontal axis expresses ratios of distances among the rotating elements determined by the gear ratios of planetary gear sets G1, G2 and G4. When the distance between carrier C1 (ring gear R2 and sun gear S4) and carrier C2 (ring gear R4) is equal to one; the distance (or the ratio of distance) between carrier C1 (R2, S4) and ring gear R1 is equal to a; and the distance (or the ratio of distance) between carrier C2 (R4) and sun gear S1 (S2, C4) is equal to β. In third planetary gear set G3, the distance between ring gear R3 and carrier C3 is set equal to one, and the distance (or the ratio of distance) between carrier C3 and sun gear S3 is δ. The vertical axis of FIG. 3 expresses the rotational speed (rpm) in the forward direction on the upper side of the point of zero, and the rotational speed (rpm) in the reverse or opposite direction on the lower side of the zero point. Moreover, Nm1 and Nm2 are the rotational speeds (rpm) of first and second motor/generators MG1 and MG2, respectively; Ne is the rotational speed (rpm) of engine ENG, and No is the rotational speed (rpm) of first and second output shafts Out1 and Out2. FIG. 3 further shows, in the form of vector along the vertical axis, torques Tm1 and Tm2 of first and second motor/generators MG1 and MG2, an engine torque Te, and torques To1 and To2 of first and second output shafts Out1 and Out2.

In FIG. 3, first, second, third and fourth planetary gear sets G1, G2, G3 and G4 are expressed, respectively, by levers G1, G2, G3 and G4.

When first and second sun gears S1 and S2 are in the disconnect state by disengaging high clutch H/C and low brake L/B, and first carrier C1 and second ring gear R2 are connected together by input clutch Cin so that engine rotation Ne is inputted equally to C1 and R2, then the elements within a rectangle of one dot chain line in FIG. 3 are arranged in lines along the vertical axis so that the corresponding elements rotate as a unit, and the arrangement is equivalent to the gear system in which third planetary gear set G3 is eliminated. Because the wheels are rolling at the same peripheral speed on a road surface, and hence the first and second output shafts Out1 and Out2 rotate at the same speed No; the levers G1, G2 ad G4 are aligned in a straight line, as shown, as an example, in FIG. 4, and the diagram is equivalent to the lever diagram which does not have lever G3.

Figure 4:
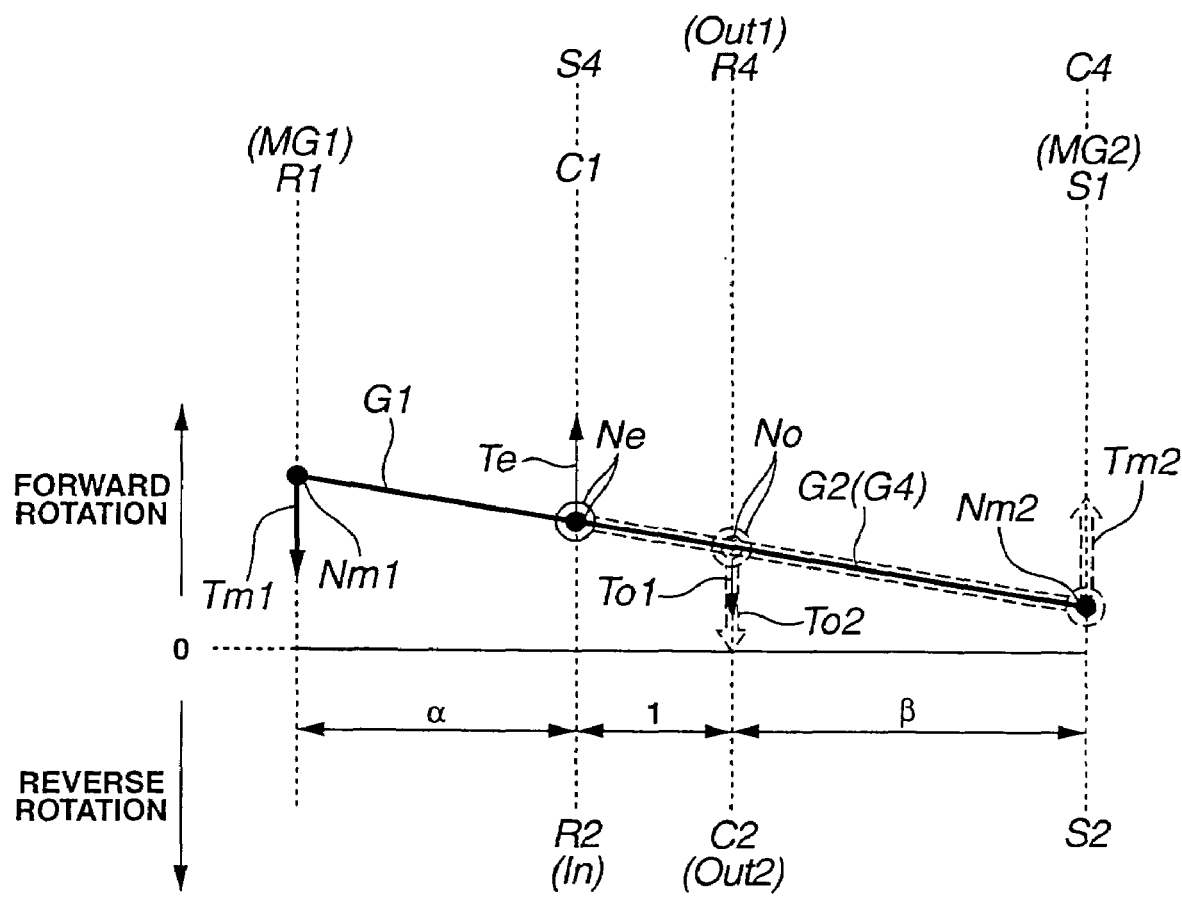
FIG. 4 is a lever diagram of the hybrid transmission of FIG. 2 when an intermediate gear ratio is selected in the high mode.

In the shift state (gear ratio) shown in FIG. 4, engine torque Te is plus or positive torque, and output torques To1 and To2 of first and second output shafts Out1 and Out2 are both load (minus) torque in the form of running resistance. In the lever diagram of FIG. 4, in order to balance levers G1 and G2 (G4) by engine torque Te and output torques To1 and To2, too, the torque Tm1 of first motor/generator MG1 must be a generating (minus) torque shifting the rotational speed toward zero, and the torque Tm2 of second motor generator MG2 must be a motor (plus) torque shifting the rotational speed away from zero.

In this case, first and second motor/generator MG1 and MG2 perform the generator function and the motor function. Therefore, the system can operate the second motor/generator MG2 on the motor side, by the power from first motor/generator MG1 on the generator side even if the power from battery 25 (shown in FIG. 1) is zero, and thereby maintain the shift state (gear speed) shown by levers G1 and G2 (G4) in FIG. 4. If it is not possible to maintain the shift state, it is possible to maintain the shift state shown by levers G1 and G2 (G4) in FIG. 4 by breaking the power balance of motor/generators MG1 and MG2.

Figure 5:
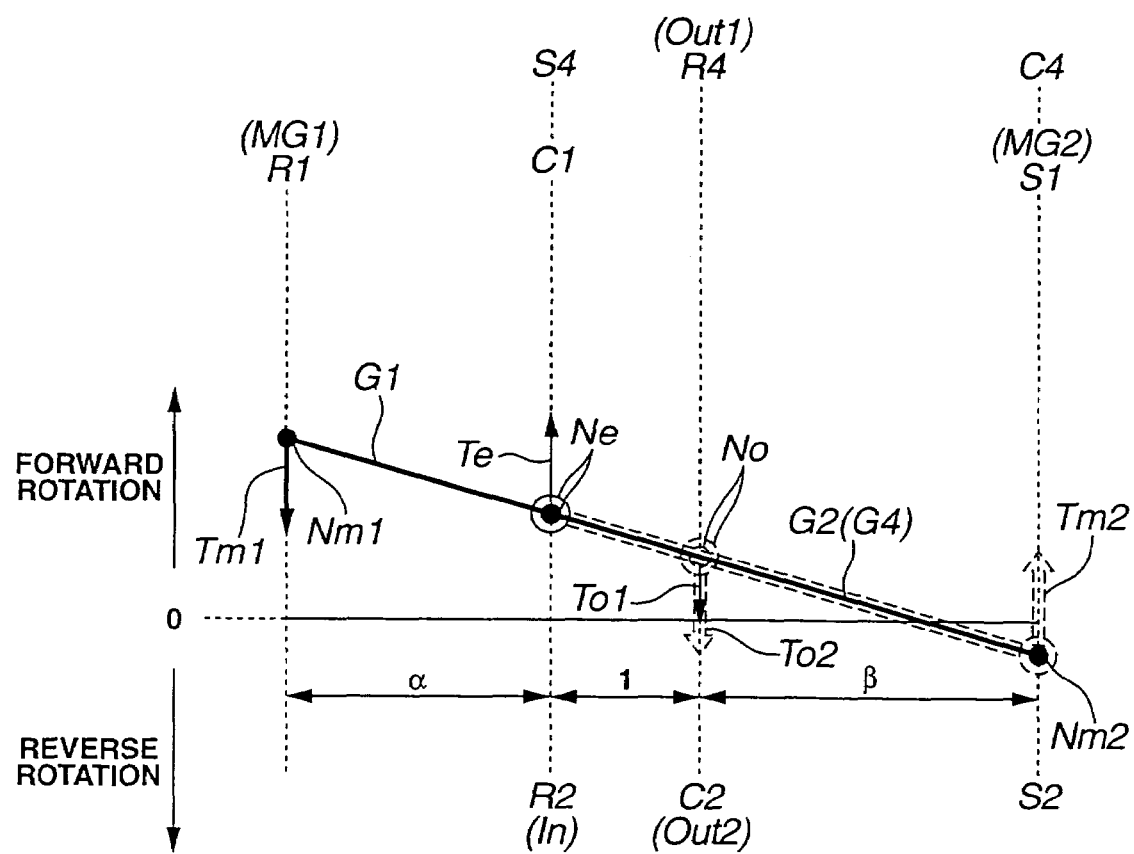
FIG. 5 is a lever diagram of the hybrid transmission of FIG. 2 when a low side gear ratio is selected in the high mode.

FIG. 5 shows levers G1 and G2 (G4) in a low side shift state in which, though engine torque Te is a plus (positive) torque, and first and second output torque To1 and To2 of first and second output shafts Out1 and Out2 are load (minus) torques, the rotational speed Nm2 of second motor/generator MG2 is negative, so that output shaft speed No is lowered as compared to the shift state of FIG. 4. In the lever diagram of FIG. 5, in order to maintain levers G1 and G2 (G4) in a balanced state by engine torque Te and output torques To1 and To2, too, the torque Tm1 of first motor/generator MG1 must be a generating (minus) torque shifting the rotational speed toward zero as in FIG. 4, and the torque Tm2 of second motor generator MG2 must be a generating (minus) torque shifting the rotational speed toward zero unlike the case of FIG. 4. In this case, the hybrid transmission system can charge battery 25 (shown in FIG. 1) with power generated by first and second motor/generator MG1 and MG2, and at the same time maintain the low side shift state expressed by levers G1 and G2 (G4) in FIG. 5.

Figure 6:
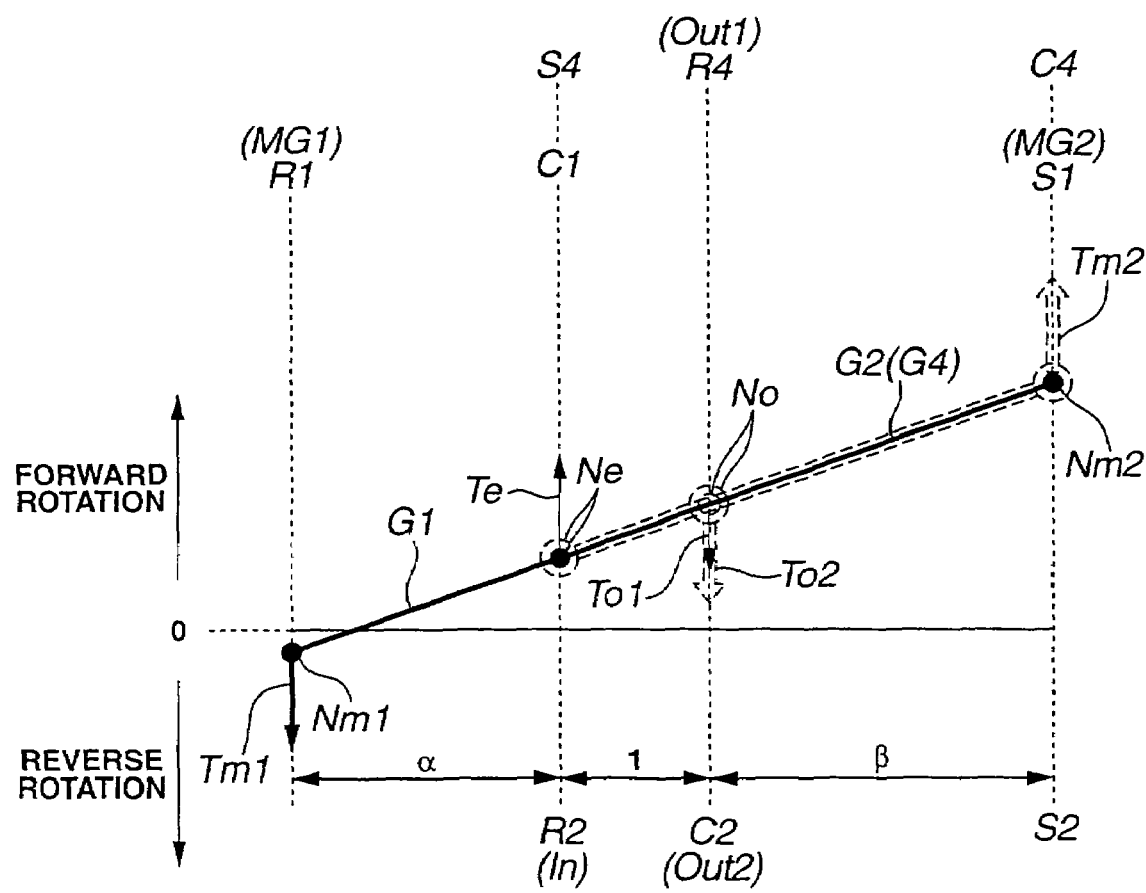
FIG. 6 is a lever diagram of the hybrid transmission of FIG. 2 when a high side gear ratio is selected in the high mode.

FIG. 6 shows levers G1 and G2 (G4) in a high side shift state in which, though engine torque Te is a plus (positive) torque, and first and second output torque To1 and To2 of first and second output shafts Out1 and Out2 are load (minus) torques, the rotational speed Nm1 of first motor/generator MG1 is negative, so that output shaft speed No is increased as compared to the shift state of FIG. 4. In the lever diagram of FIG. 6, in order to maintain levers G1 and G2 (G4) in a balanced state by engine torque Te and output torques To1 and To2, too, the torque Tm2 of second motor/generator MG2 must be a motor (plus) torque shifting the rotational speed away from zero, and the torque Tm1 of first motor generator MG1 must be a motor (plus) torque shifting the rotational speed away from zero unlike the case of FIG. 4. In this case, first and second motor/generators MG1 and MG2 function as motor by consuming power from battery 25, and thereby the hybrid transmission system can maintain the high side shift state expressed by levers G1 and G2 (G4) in FIG. 6.

Figure 7:
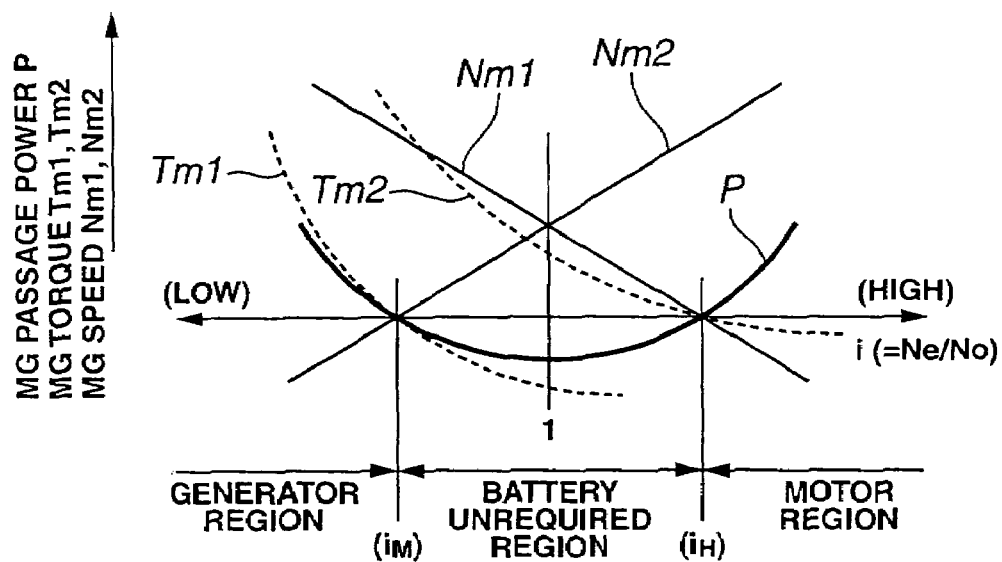
FIG. 7 is a characteristic view for showing variation characteristics of the rotational speeds and torques of first and second motor/generators in the hybrid transmission of FIG. 2 in the high mode with respect to the gear ratio, together with a passage power through the motor/generators.

FIG. 7 shows variation tendencies of speeds Nm1 and Nm2 and torques Tm1 and Tm2 of first and second motor/generators MG1 and MG2, together with a passage power P through motor/generators MG1 and MG2, with respect to gear ratio i (Ne/No) in the above-mentioned shift operations. Passage power P is equal to zero at a gear ratio value $i_M$ at which second motor/generator speed Nm2 is zero and first motor/generator torque Tm1 is zero, and at a gear ratio value $i_H$ at which second motor/generator torque Tm2 is zero and first motor/generator speed Nm1 is zero.

Therefore, the shift state shown in FIG. 4 corresponds to an intermediate shift region or battery unrequited shift region between the gear ratio $i_M$ at which P is zero, and the gear ratio $i_H$ at which P is zero. In this region between $i_M$ and $i_H$, the second motor/generator MG2 is operated in the motor mode by power generated by first motor/generator MG1, and therefore the hybrid transmission system can maintain the shift state (the gear ratio) without resort to the power of battery 25.

The shift state shown in FIG. 5 corresponds to a lower shift region or generator mode shift region on the low side of the gear ratio $i_M$. In this region, first and second motor/generators MG1 and MG2 are both operated in the generator mode, and therefore the hybrid transmission system can maintain the shift state (the gear ratio) while charging battery 25. In this region, however, the second motor/ generator torque Tm2 or the first motor/generator speed Nm1 is increased, so that the sizes of motor/generators GM1, GM2 are increased.

The shift state shown in FIG. 6 corresponds to a higher shift region or motor mode shift region on the high side of the gear ratio iH. In this region, first and second motor/generators MG1 and MG2 are both operated in the motor mode, and therefore the hybrid transmission system can maintain the shift state (the gear ratio) while consuming the power from battery 25. In this region, however, the first motor/generator torque Tm1 or the second motor/generator speed Nm2 is increased, so that the sizes of motor/generators GM1, GM2 are increased.

In the intermediate region between iM and iH, the hybrid transmission can maintain the shift state without using the power of battery 25, so that the size of battery 25 can be reduced, as mentioned before. Moreover, as evident from FIG. 7, the speeds Nm1 and Nm2 and torque Tm1 and Tm2 of first and second motor/generators MG1 and MG2 are all small, and the sizes of motor/generators MG1 and MG2 can be reduced. Therefore, in this example, the hybrid transmission system is configured to use the intermediate region between iM and iH, as a normal practical operating region. Consequently, it is possible to reduce the size of battery 25 and the sizes of motor/generators MG1 and MG2.

The following equations (1)~(13) are mathematical formulae expressing rotational balanced conditions and torque balanced conditions of levers G1 and G2 (G4) in the diagrams shown in FIGS. 4~6.

$$Ne + \alpha(Ne - No) = Nm1 \qquad (1)$$

$$No + \beta(No - Ne) = Nm2 \qquad (2)$$

$$Te \cdot i + To = 0 \qquad (3)$$

$$i = Ne/No \qquad (4)$$

$$To = To1 + To2 \qquad (5)$$

$$Te = Te1 + Te2 \qquad (6)$$

$$Tm1 + Te1 + To1 = 0 \qquad (7)$$

$$Tm2 + Te2 + To2 = 0 \qquad (8)$$

$$Nm2 \cdot Tm2 + Nm1 \cdot Tm1 = 0 \qquad (9)$$

$$\alpha \cdot Tm1 = To1 \qquad (10)$$

$$Te2 = \alpha \cdot Tm2 \qquad (11)$$

$$Tm2 = -(Nm1 \cdot Te \cdot i)/\{Nm1(1+\beta) + \alpha \cdot Nm2\} \qquad (12)$$

$$Tm1 = -(Nm2 \cdot Te)/\{Nm2(1+\alpha) + \beta \cdot Nm1\} \qquad (13)$$

Figure 8:
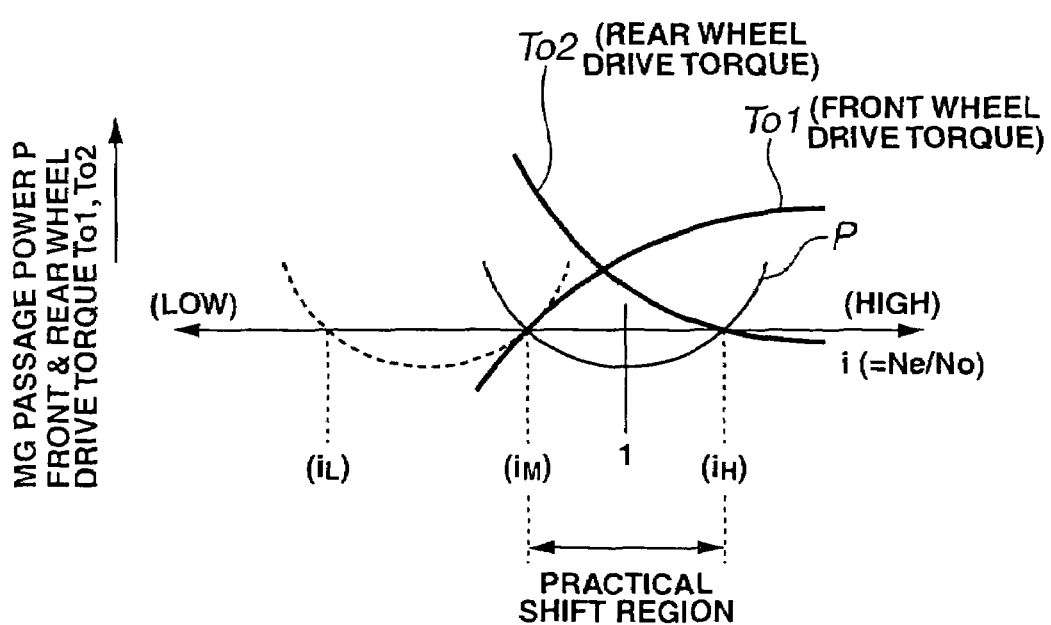
FIG. 8 is a characteristic view for showing a characteristic of a front and rear wheel driving force distribution of the hybrid transmission of FIG. 2 in the high mode, with respect to the gear ratio, and a practical shift range of the hybrid transmission in the high mode.

From equations (12) and (13) obtained by solving equations (1)~(11), it is possible to determine motor/generator torques Tm2 and Tm1. Therefore, the control system can perform a predetermined shift control by sending these motor/generator torques Tm2 and Tm1, and the engine torque Te, as commands, respectively, to the motor controller 23 and engine controller 22. Similarly, by solving equations (1)~(11) for the drive torques To1 and To2 (front and rear wheel drive torques) of first and second output shafts Out1 and Out2, it is possible to determine the front and rear wheel drive torques To1 and To2 as shown in FIG. 8. In the intermediate region between the gear ratios iM and iH, the control system can achieve an optimum front and rear wheel drive torque distribution in accordance with the gear ratio by controlling the drive torque distribution to the rear wheel drive mode or the four wheel drive mode on a lower side requiring a relatively great drive torque, and by controlling the drive torque distribution to the front wheel drive mode on a higher side on which the required drive torque is relatively small.

Figure 9:
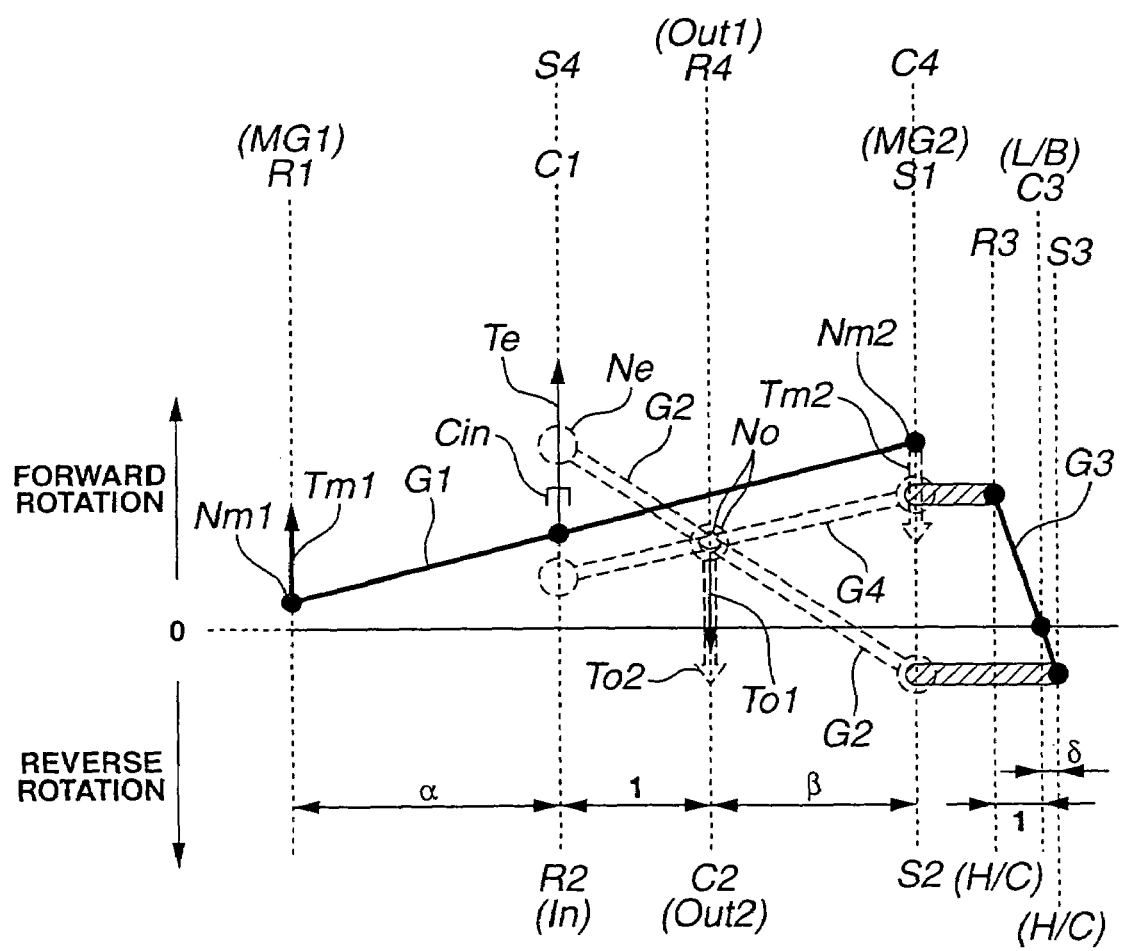
FIG. 9 is a lever diagram of the hybrid transmission of FIG. 2 in a low mode select state.
Figure 10:
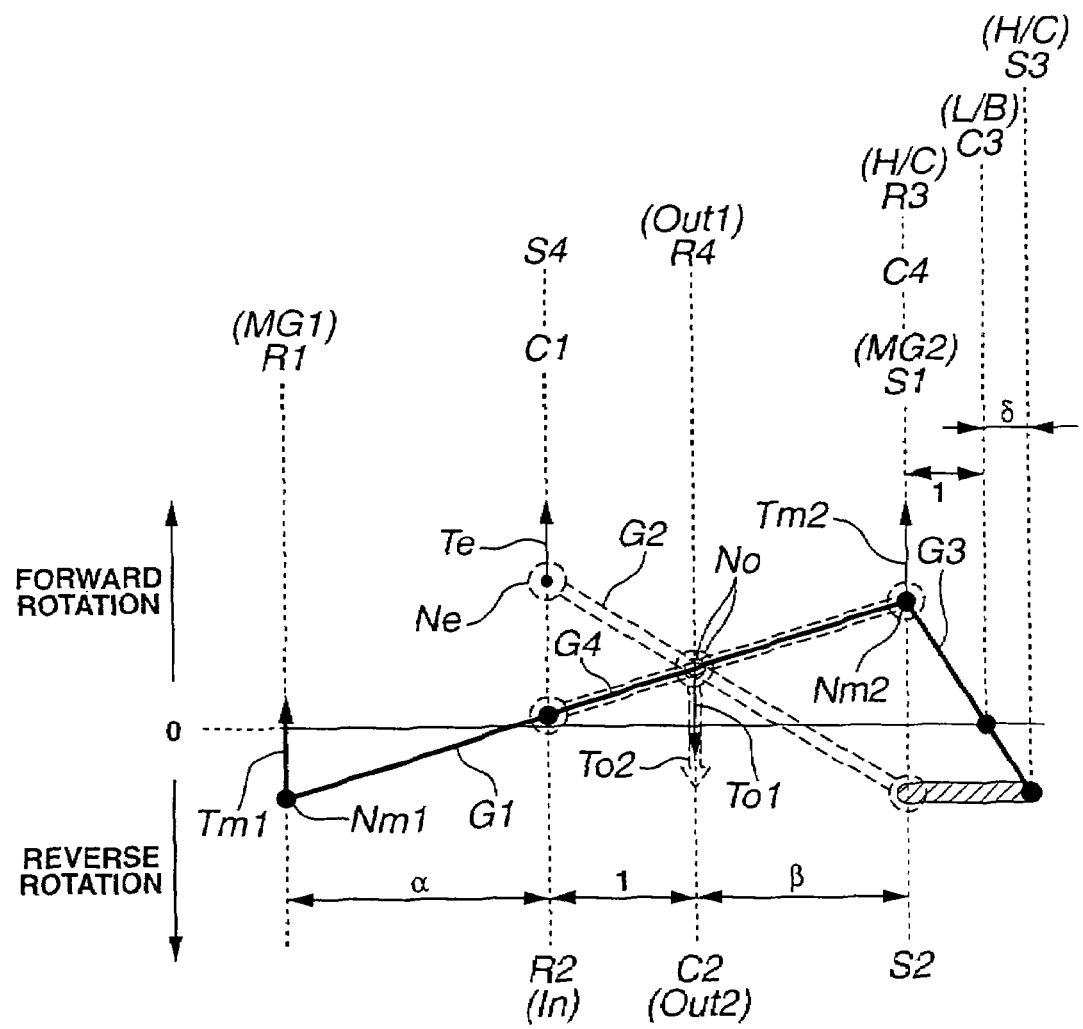
FIG. 10 is a lever diagram of the hybrid transmission of FIG. 2 when a low side ratio is selected in the low mode.

When, in the hybrid transmission expressed by the lever diagram of FIG. 3, the first and second sun gears S1 and S2 are put in the reverse enable state by releasing high clutch H/C and engaging low brake L/B, and the engine rotation is inputted only to ring gear R2 by disengaging input element clutch Cin (the engine rotation Ne is not inputted to carrier C1); then the lever diagram of FIG. 3 is shifted to the form as shown in the lever diagram of FIG. 9 because the rotational speeds of carrier C1 and ring gear R2 can be differentiated from each other, the sun gears S1 and S2 are put in the reverse enable state by third planetary gear set G3, and the rotational speeds of first and second output shafts Out1 and Out2 are held equal to the same speed No. In this case, practically, the fourth lever G4 overlaps the first lever G1 so as to form a single lever, as shown in FIG. 10 in which the single lever of G1 and G4 intersects the second lever G2. In FIG. 9, lever G4 is offset from lever G1 to a position parallel to G1 for the sake of convenience to make visible the levers individually.

In the shift state of FIG. 10, engine torque Te is plus, and the output torques To1 and To2 of first and second output shafts Out1 and Out 2 are minus (load torque). To hold the levers G1 (G4) and G2 in the balanced state with engine torque Te and output torque To1 and To2, the torque Tm1 of first motor/generator MG1 connected with ring gear R1 must be minus (generator torque) and the torque To2 of second motor/generator MG2 connected with sun gear S1 must be plus (motor torque).

In this case, first and second motor/generators MG1 an MG2 perform the generator function and the motor function, and the second motor/generator MG2 is operated in the motor mode by the power generated by first motor/generator MG1 operated in the generator mode without using the power from battery 25. Thus, the hybrid transmission can maintain the shift state (the gear ratio shifted maximally to the LOW side) shown by lever G1 (G4) and G2 in FIG. 10. If it is not possible to maintain the shift state in this way, it is possible to maintain the shift state shown by levers G1 (G4) and G2 in FIG. 10 by losing the power balance of motor/generators MG1 and MG2.

Figure 11:
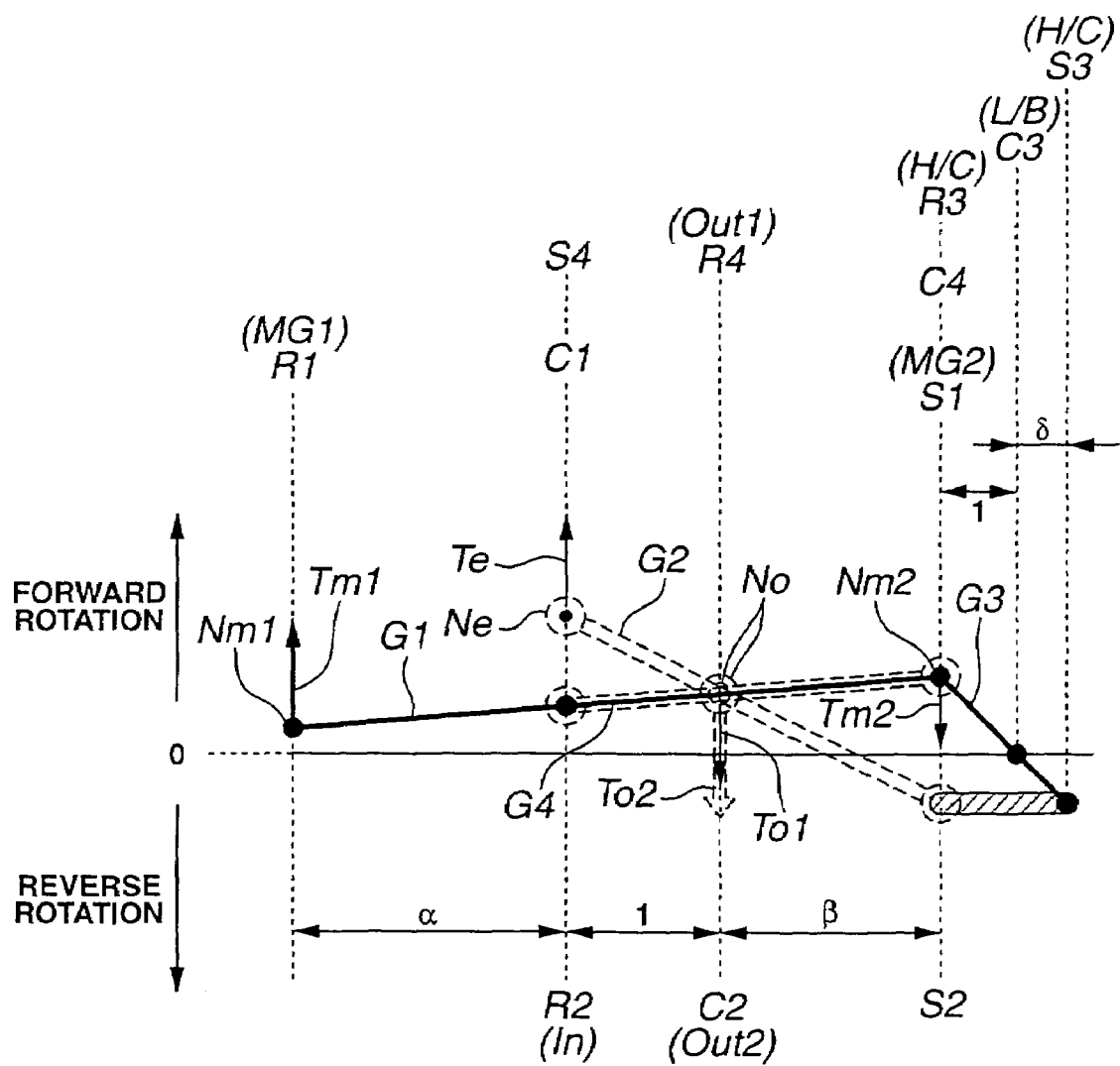
FIG. 11 is a lever diagram of the hybrid transmission of FIG. 2 when a high side gear ratio is selected in the low mode.

FIG. 11 shows the levers G1 (G4) and G2 in the shift state in which the intersecting state between lever G1 (G4) and G2 is shifted, by lever G3, to the form in which the speed Nm1 of first motor/generator MG1 is varied from a negative value of FIG. 10, to a positive value. In this state, engine torque Te is plus, and first and second output torque To1 and To2 of first and second output shafts Out1 and Out2 are both minus (load), but the rotational speed Nm1 of first motor/generator MG1 is positive, so that the shift state is the high side shift state in which the engine speed Ne is lowered as compared to the shift state of FIG. 10. In the lever diagram of FIG. 11, in order to maintain levers G1 (G4) and G2 in the balanced state by engine torque Te and output torques To1 and To2, the torque Tm1 of first motor/generator MG1 must be plus (load) unlike the shift state of FIG. 10, and the torque Tm2 of second motor generator MG2 must be minus (generator torque) to shift the rotational speed toward zero unlike the case of FIG. 10.

In this case, first and second motor/generator MG1 and MG2 perform the motor function and the generator function, and the hybrid transmission can maintain the shift state (the high side gear ratio) shown by levers G1 (G4) and G2 in FIG. 11, by operating the first motor/generator MG1 in the motor mode with the power generated by second motor/generator MG2 on the generator side, without requiring the power from battery 25. If the maintenance is not feasible, it is possible to maintain the shift state shown by levers G1 (G4) and G2 in FIG. 11 by losing the power balance of motor/generators MG1 and MG2.

Figure 12:
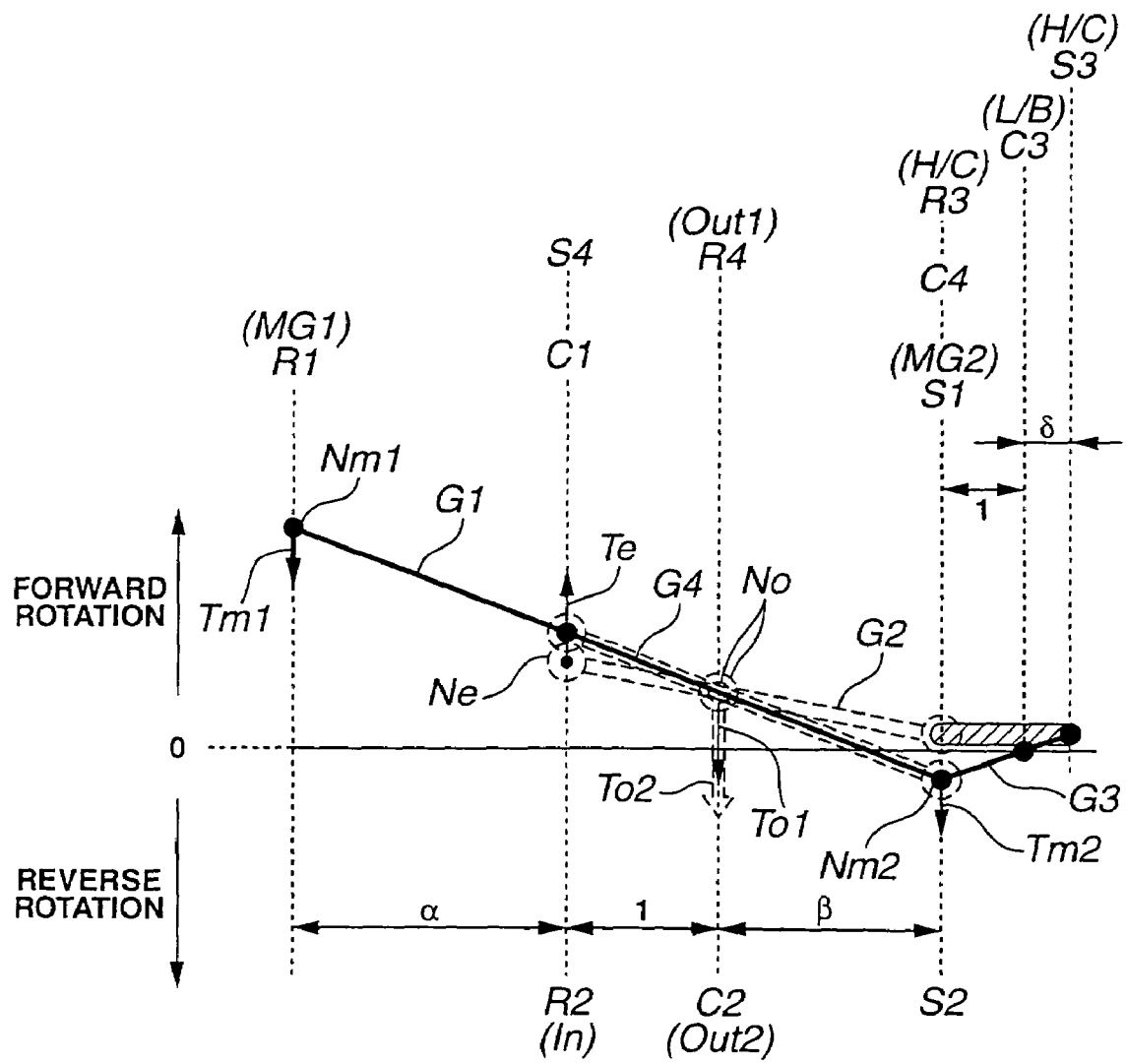
FIG. 12 is a lever diagram of the hybrid transmission of FIG. 2 when an overdrive gear ratio is selected in the low mode.

FIG. 12 shows the levers G1 (G4) and G2 in the high side shift state in which the intersecting state between lever G1 (G4) and G2 is shifted, by lever G3, to the form in which the speed Nm2 of second motor/generator MG2 is varied from the positive value of FIG. 11, to a negative value. In this state, engine torque Te is plus, and first and second output torque To1 and To2 of first and second output shafts Out1 and Out2 are both minus (load), and the rotational speed Nm2 of second motor/generator MG2 is negative, so that the shift state is the high side shift state in which the engine speed Ne is further lowered as compared to the shift state of FIG. 11. In the lever diagram of FIG. 12, in order to maintain levers G1 (G4) and G2 in the balanced state by engine torque Te and output torques To1 and To2, the torque Tm1 of first motor/generator MG1 must be minus (generator torque) unlike the shift state of FIG. 11, and the torque Tm2 of second motor generator MG2 must be plus (load torque) to shift the rotational speed away from zero unlike the case of FIG. 11.

In this case, first and second motor/generator MG1 and MG2 perform the generator function and the motor function, and the hybrid transmission can maintain the shift state (the high side gear ratio) shown by levers G1 (G4) and G2 in FIG. 12, by operating the second motor/generator MG2 in the motor mode with the power generated by first motor/generator MG1 on the generator side, without requiring the power from battery 25. If the maintenance is not feasible, it is possible to maintain the shift state shown by levers G1 (G4) and G2 in FIG. 12 by losing the power balance of motor/generators MG1 and MG2.

Figure 13:
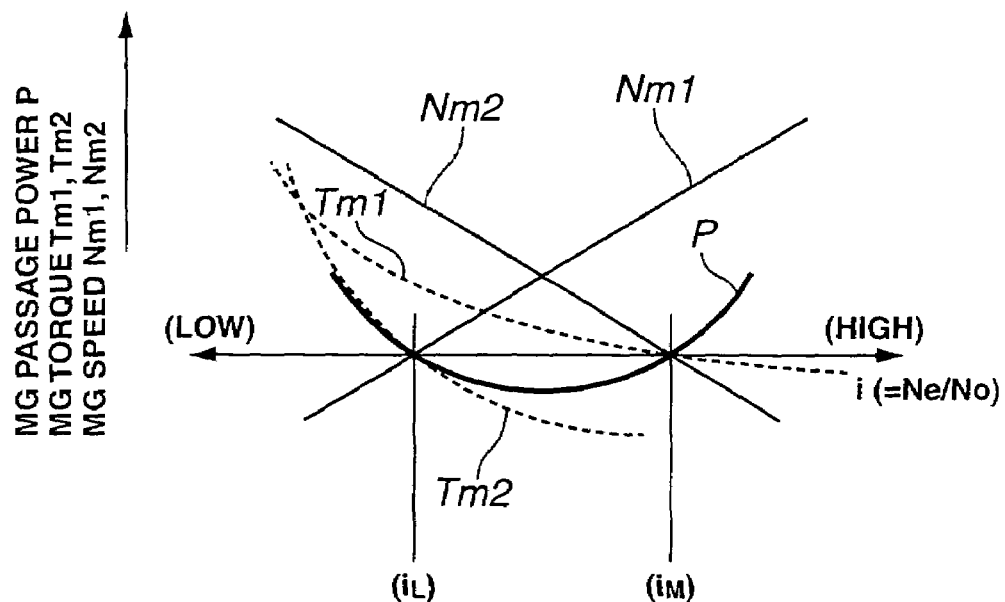
FIG. 13 is a characteristic view for showing variation characteristics of the rotational speeds and torques of first and second motor/generators in the hybrid transmission of FIG. 2 in the low mode with respect to the gear ratio, together with the passage power through the motor/generators.

FIG. 13 shows variation tendencies of speeds Nm1 and Nm2 and torques Tm1 and Tm2 of first and second motor/generators MG1 and MG2, together with passage power P through motor/generators MG1 and MG2, with respect to gear ratio i (Ne/No) in the hybrid transmission according to this embodiment. Passage power P is equal to zero at gear ratio value iM at which second motor/generator speed Nm2 is zero and first motor/generator torque Tm1 is zero, and at a gear ratio value iL at which second motor/generator torque Tm2 is zero and first motor/generator speed Nm1 is zero.

Therefore, the shift state shown in FIG. 10 corresponds to a low side shift region on the low side of low side gear ratio iL; the shift state of FIG. 11 corresponds to an intermediate shift region between the low side gear ratio iL at which P is zero, and the high side gear ratio iM at which P is zero; and the shift state of FIG. 12 corresponds to a high side region on the high side of the high side gear ratio iM. In this embodiment, in any of the shift states of FIGS. 10~12 (in all the shift regions, that is) the hybrid transmission can maintain the shift state (gear ratio) by operating one of the first and second motor/generators MG1 and MG2 in the motor mode by using the power generated by the other of the first and second motor/generators on the generator side, without resort to the power of battery 25, so that the size of battery 25 can be reduced.

Especially in the intermediate region between iL and iM, the hybrid transmission can maintain the shift state without using the power of battery 25, so that the size of battery 25 can be reduced, as mentioned before. Moreover, as evident from FIG. 13, the speeds Nm1 and Nm2 and torque Tm1 and Tm2 of first and second motor/generators MG1 and MG2 are all small, and the sizes of motor/generators MG1 and MG2 can be reduced. Therefore, in this example, the hybrid transmission system is configured to use the intermediate region between iL and iM, as the normal practical operating region, so that it is possible to reduce the size of battery 25 and the sizes of motor/generators MG1 and MG2. In this example, the normal practical operating region is set wider than the intermediate region between iL and iM, to facilitate the switching operation (mode changeover) with the high side normal practical operation region shown in FIG. 8.

The following equations (14)~(31) are mathematical formulae expressing rotational balanced conditions and torque balanced conditions of levers G1 (G4), G2 and G3 in the diagrams shown in FIGS. 10~12.

$$Nm1=\{(\alpha+1)/\beta\}Nm2+\{1+(\alpha+1)/\beta\}No \quad (14)$$

$$Nm2=-(1/\delta)N3 \quad (15)$$

$$N3=-\beta \cdot Ne+(1+\beta)No \quad (16)$$

$$Te \cdot i + To = 0 \quad (17)$$

$$i=Ne/No \quad (18)$$

$$To=To1+To2 \quad (19)$$

$$T1+T3A=Tm2 \quad (20)$$

$$Tm1+T1+To1=0 \quad (21)$$

$$Te+T2+To1=0 \quad (22)$$

$$\delta \cdot T3B+T3A=0 \quad (23)$$

$$T3B=T2 \quad (24)$$

$$Nm1 \cdot Tm1+Nm2 \cdot Tm2=Pb \quad (25)$$

$$\beta \cdot T2=Te \quad (26)$$

$$Tm1(\alpha+1)=\beta \cdot T1 \quad (27)$$

$$Tm1=-\{(1+\beta-i \cdot \beta)/(1+\alpha+\beta)\} \cdot Te \quad (28)$$

$$Tm2=-(Pb-Nm1 \cdot Te)/Nm2 \quad (29)$$

$$To2=[\{(1+\beta)/\beta\}-i] \cdot Te \quad (30)$$

$$To1=\{(1+\beta)/\beta\} \cdot Te \quad (31)$$

Figure 15:
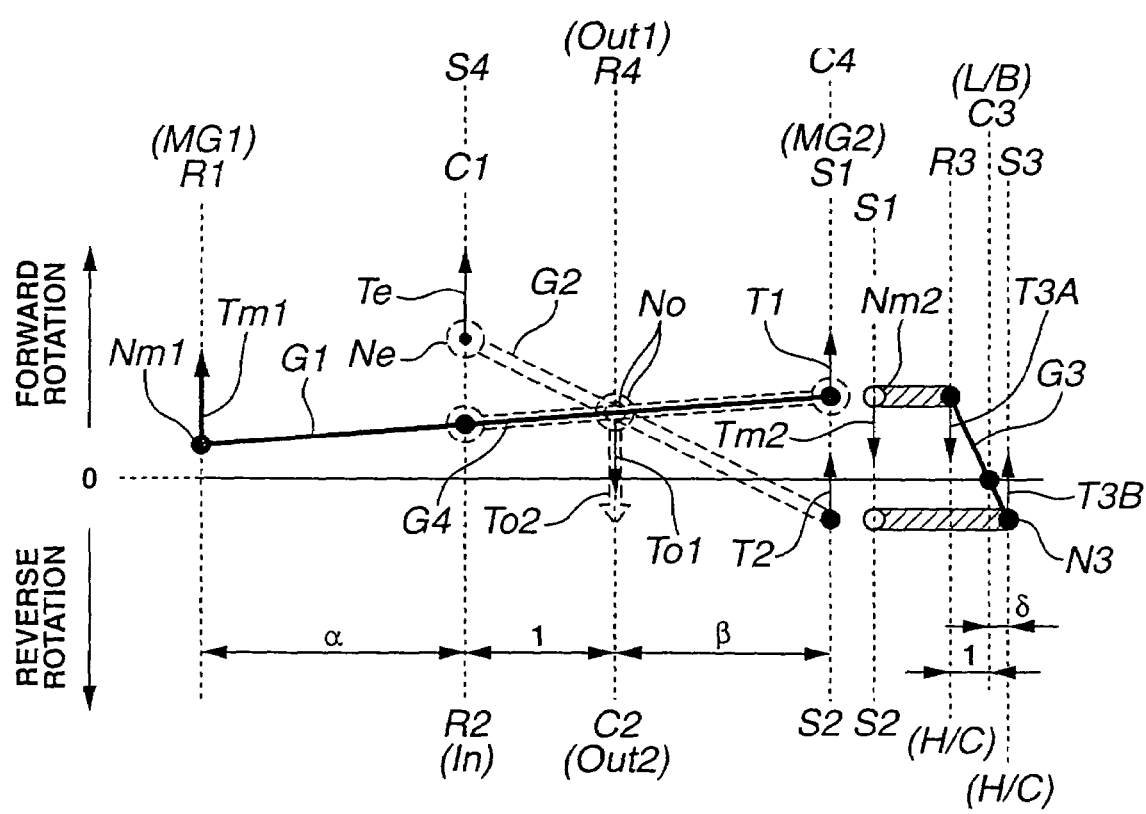
FIG. 15 is a view for illustrating symbols used in rotational speed balance equations and torque balance equation in the lever diagrams of FIGS. 10~12.

In these expressions, symbols denote rotational speeds and torques shown in FIG. 15 corresponding to the arrangement in which lever G3 is cut off from lever G1 (G4) and lever G2 in the diagrams of FIGS. 10~12. The symbol Pb denotes a battery power.

Figure 16:
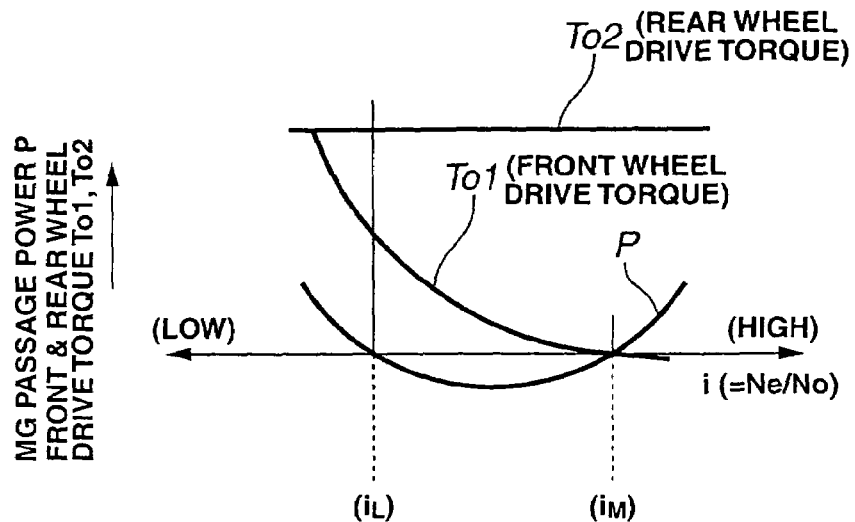
FIG. 16 is a characteristic view for showing a characteristic of a front and rear wheel driving force distribution of the hybrid transmission of FIG. 2 in the low mode, with respect to the gear ratio.

Equations (28)~(31) can be obtained by solving equations (14)~(27). From equations (28) and (29), it is possible to determine motor/generator torques Tm2 and Tm1. Therefore, the control system can perform a predetermined shift control by sending these motor/generator torques Tm2 and Tm1, and the engine torque Te, as commands, respectively, to the motor controller 23 and engine controller 22. From equations (31) and (30), it is possible to determine the drive torques To1 and To2 (front and rear wheel drive torques) of first and second output shafts Out1 and Out2, as shown in FIG. 16. Accordingly, the control system can achieve an optimum front and rear wheel drive torque distribution in accordance with the gear ratio by controlling the drive torque distribution to the four wheel drive mode in the low side shift region requiring a relatively great drive torque, and by shifting the drive torque distribution gradually to the rear two wheel drive mode by lowering the front wheel drive torque To1 with the shift of the gear ratio to the high side.

Figure 17:
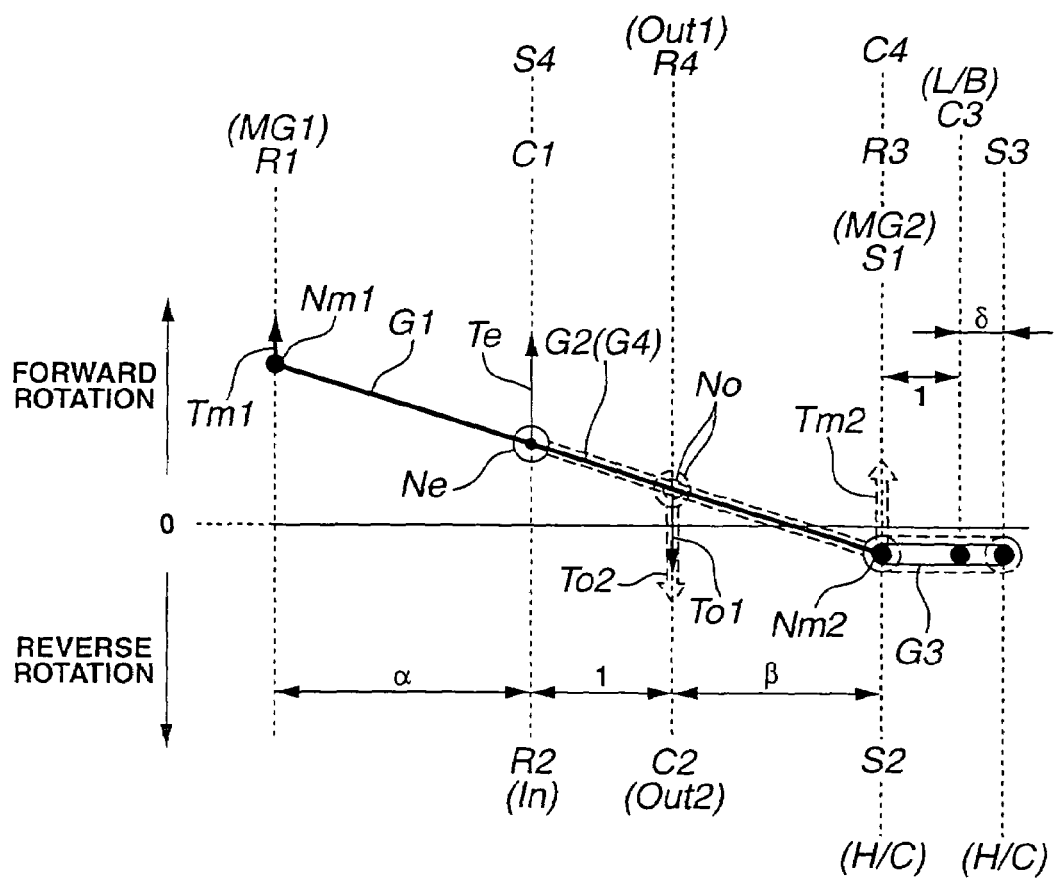
FIG. 17 is a lever diagram of the hybrid transmission of FIG. 2 when a low side ratio is selected in an overdrive mode.

When, in the hybrid transmission expressed by the lever diagram of FIG. 3, the first and second sun gears S1 and S2 are put in the unitary rotational state with third planetary gear set G3, by engaging high clutch H/C and disengaging low brake L/B, and the engine rotation is inputted only to ring gear R2 by disengaging input element clutch Cin (the engine rotation Ne is not inputted to carrier C1); then the lever diagram of FIG. 3 is shifted to the form as shown in the lever diagram of FIG. 17 because the rotational speeds of carrier C1 and ring gear R2 can be differentiated from each other, but the sun gears S1 and S2 are put in the unitary rotational state by third planetary gear set G3, and the rotational speeds of first and second output shafts Out1 and Out2 are held equal to the same speed No. In this state shown in FIG. 17, levers G1, G2 and G4 are aligned in a straight line as shown in FIG. 17, and the diagram is equivalent to the lever diagram in which third planetary gear set G3 can cause sun gears S1 and S2 and carrier C4 to rotate as a unit.

In the shift state of FIG. 17, engine torque Te is plus, and the output torques To1 and To2 of first and second output shafts Out1 and Out 2 are minus (load torque). To hold the levers G1, G2 and G4 in the balanced state with engine torque Te and output torque To1 and To2, the torque Tm1 of first motor/generator MG1 connected with ring gear R1 must be plus (motor torque) and the torque Tm2 of second motor/generator MG2 connected with sun gear S1 must be minus (generator torque).

In this case, first and second motor/generators MG1 an MG2 perform the motor function and the generator function, and the first motor/generator MG1 is operated in the motor mode by the power generated by second motor/generator MG2 operated in the generator mode without using the power from battery 25. Thus, the hybrid transmission can maintain the shift state (the low side gear ratio making the output speed No lower than engine speed Ne) shown by lever G1 and G2 (G4) in FIG. 17. If it is not possible to maintain the shift state, the shift state shown by levers G1) and G2 (G4) in FIG. 17 can be maintained by losing the power balance of motor/generators MG1 and MG2.

Figure 18:
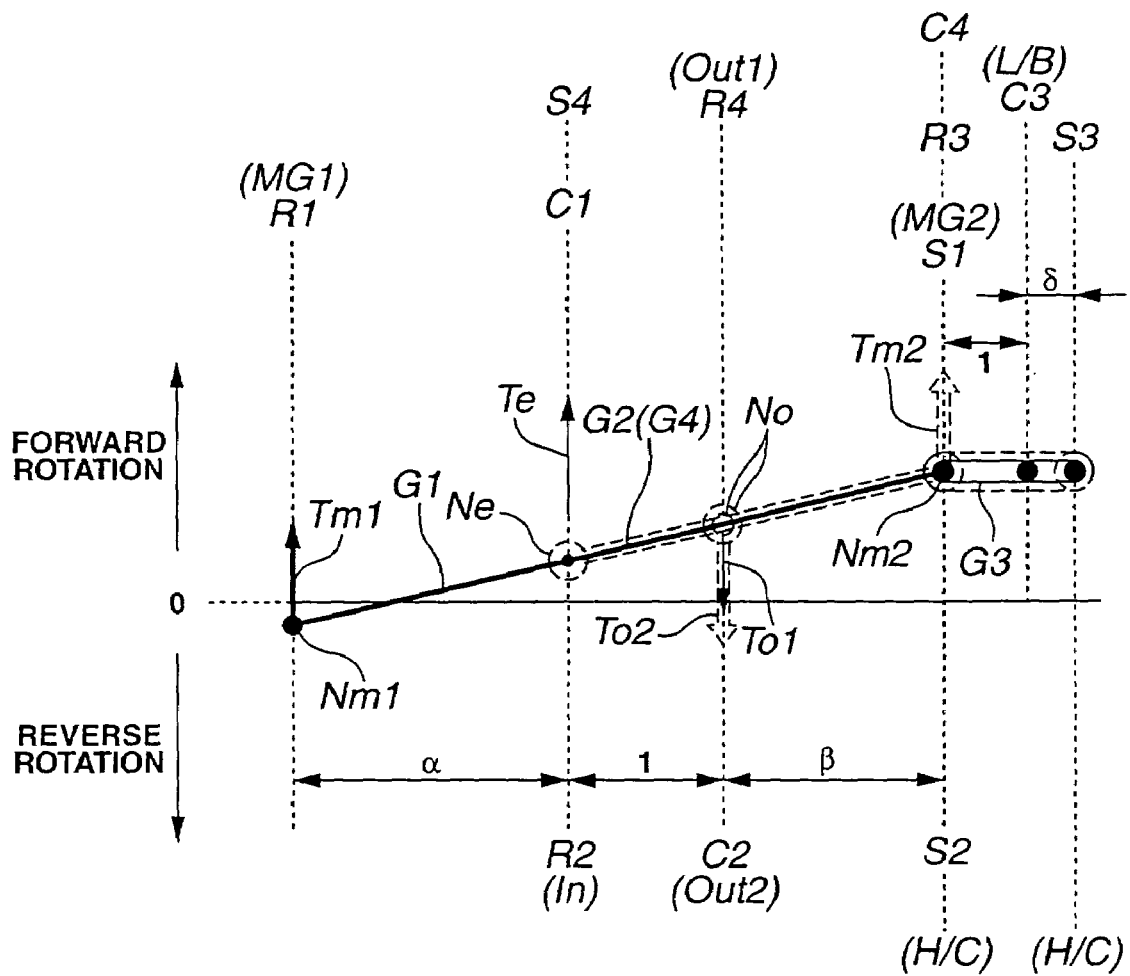
FIG. 18 is a lever diagram of the hybrid transmission of FIG. 2 when a high side gear ratio is selected in the overdrive mode.

FIG. 18 shows the levers G1 and G2 (G4) in the shift state in which the speed Nm1 of first motor/generator MG1 is varied from the positive value second motor/generator MG2 is varied from the negative value of FIG. 17, to a positive value. In this state, engine torque Te is plus, and first and second output torque To1 and To2 of first and second output shafts Out1 and Out2 are both minus (load), the rotational speed Nm1 of first motor/generator MG1 is negative, and the rotational speed Nm2 of second motor/generator MG2 is positive, so that the shift state is the overdrive gear ratio select state increasing the output speed No higher than engine speed Ne. In the lever diagram of FIG. 18, in order to maintain levers G1 and G2 (G4) in the balanced state by engine torque Te and output torques To1 and To2, the torque Tm1 of first motor/generator MG1 must be minus (generator torque) unlike the shift state of FIG. 17, and the torque Tm2 of second motor generator MG2 must be plus (load torque) to shift the rotational speed away from zero unlike the case of FIG. 17.

In this case, first and second motor/generator MG1 and MG2 perform the generator function and the motor function, and the hybrid transmission can maintain the shift state (the overdrive gear ratio) shown by levers G1 and G2 (G4) in FIG. 18, by operating the second motor/generator MG2 in the motor mode with the power generated by first motor/generator MG1 on the generator side, without requiring the power from battery 25. If the maintenance is not feasible, it is possible to maintain the shift state shown by levers G1 and G2 (G4) in FIG. 18 by losing the power balance of motor/generators MG1 and MG2.

Figure 19:
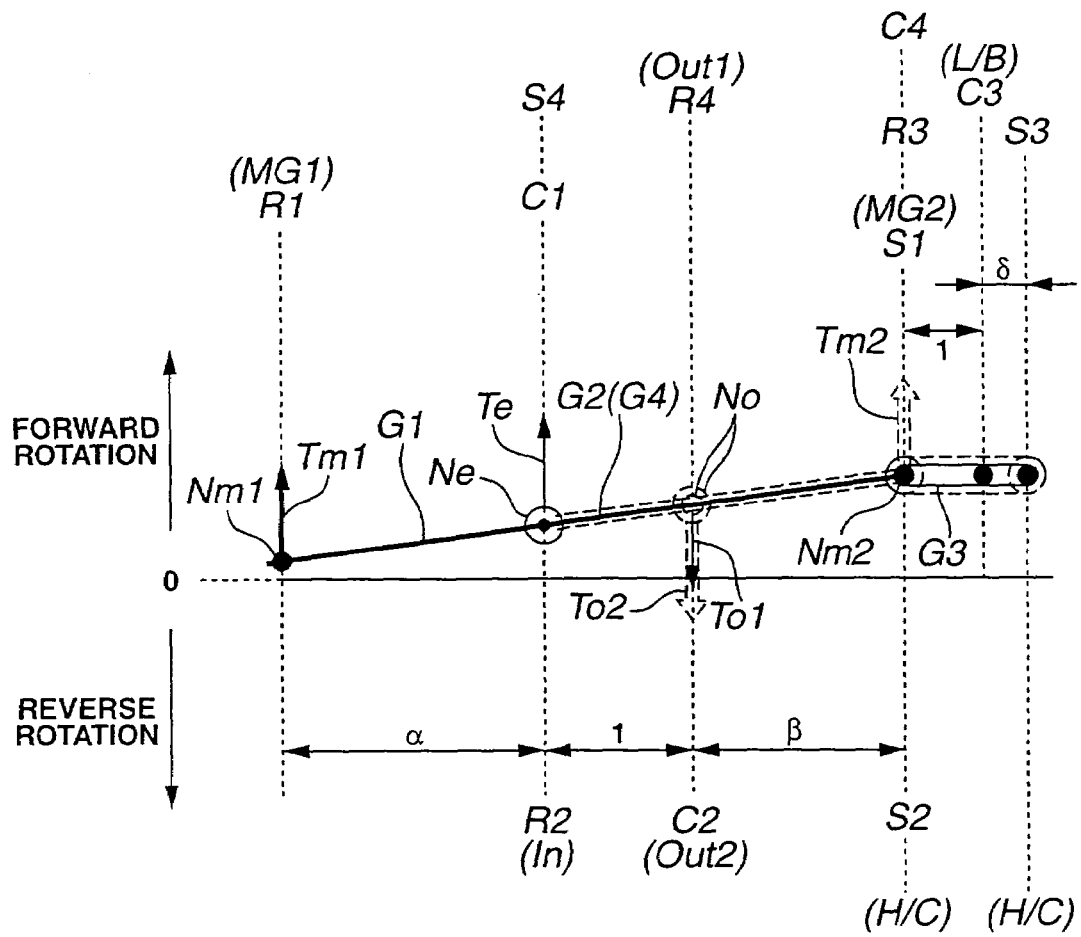
FIG. 19 is a lever diagram of the hybrid transmission of FIG. 2 when an intermediate gear ratio is selected in the overdrive mode.

FIG. 19 shows the levers G1 and G2 (G4) in the shift state in which the speed Nm2 of second motor/generator MG2 is varied from the negative value of FIG. 17, to a positive value. In this state, engine torque Te is plus, and first and second output torque To1 and To2 of first and second output shafts Out1 and Out2 are both minus (load), but the rotational speed Nm2 of second motor/generator MG2 is positive, so that the shift state is the intermediate shift state selecting the gear ratio intermediate between FIG. 17 and FIG. 18. In the lever diagram of FIG. 19, in order to maintain levers G1 and G2 (G4) in the balanced state by engine torque Te and output torques To1 and To2, the torque Tm1 of first motor/generator MG1 must be plus (load torque) like the shift state of FIG. 17, and the torque Tm2 of second motor generator MG2 must be plus (load torque) to shift the rotational speed away from zero unlike the case of FIG. 17. In this case, the hybrid transmission can maintain the intermediate shift state of the intermediate gear ratio shown by levers G1 and G2 (G4), with the first and second motor/generators MG1 and MG2 operating both in the motor mode using the power from battery 25.

Figure 20:
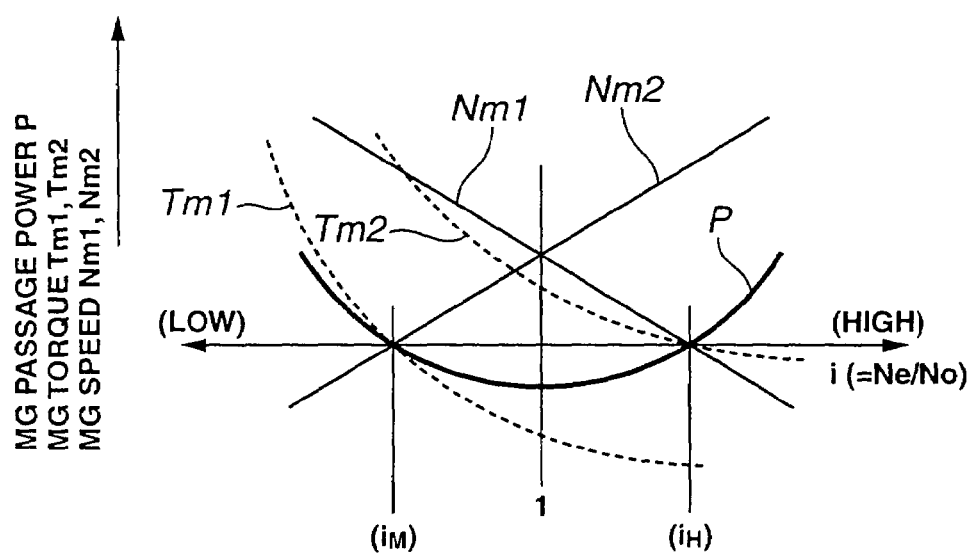
FIG. 20 is a characteristic view for showing variation characteristics of the rotational speeds and torques of first and second motor/generators in the hybrid transmission of FIG. 2 in the overdrive mode with respect to the gear ratio, together with the passage power through the motor/generators.

FIG. 20 shows variation tendencies of speeds Nm1 and Nm2 and torques Tm1 and Tm2 of first and second motor/generators MG1 and MG2, together with passage power P through motor/generators MG1 and MG2, with respect to gear ratio i (Ne/No) in the hybrid transmission according to this embodiment. Passage power P is equal to zero at gear ratio value $i_M$ at which second motor/generator speed Nm2 is zero and first motor/generator torque Tm1 is zero, and at gear ratio value $i_H$ at which second motor/generator torque Tm2 is zero and first motor/generator speed Nm1 is zero.

Therefore, the shift state shown in FIG. 17 corresponds to a low side shift region on the low side of low side gear ratio $i_M$; the shift state of FIG. 19 corresponds to an intermediate shift region between the low side gear ratio $i_M$ at which P is zero, and the high side gear ratio $i_H$ at which P is zero; and the shift state of FIG. 18 corresponds to a high side or overdrive gear ratio region on the high side of the high side gear ratio $i_H$.

In the low side shift region on the low side of $i_M$, and the overdrive region on the high side of $i_H$, the hybrid transmission can maintain the shift state (gear ratio) without resort to the power of battery 25, so that the size of battery 25 can be reduced. In the intermediate region between low side gear ratio $i_M$ and high side gear ratio $i_H$, on the other hand, the shift state (gear ratio) is maintained by using the power of battery 25. However, in this intermediate regions, the speeds Nm1 and Nm2 and torques Tm1 and Tm2 are low as shown in FIG. 20, so that the sizes of motor/generators MG1 and MG2 can be reduced.

Figure 14:
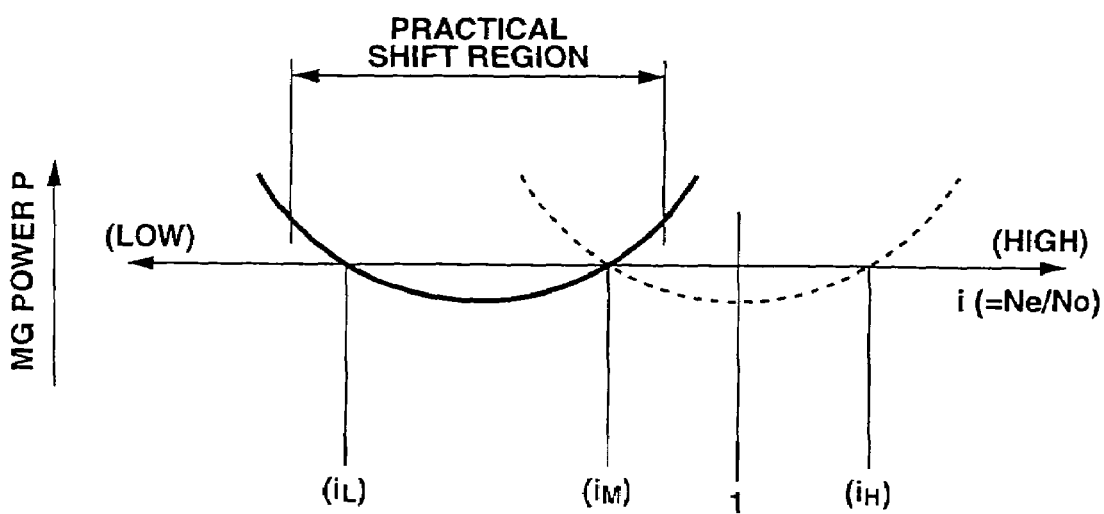
FIG. 14 is a characteristic view for showing a practical shift range of the hybrid transmission FIG. 2 in the low mode.

The hybrid transmission system can use any of the shift regions in dependence on whether priority is given to the size reduction of battery 25 or to the size reduction of motor/generators MG1 and MG2. It is possible to employ a wide shift region within a practicable range of battery 25 and motor/generators MG1 and MG2. This embodiment employ the practical shift region shown in FIG. 8 for the high side shift region in the operation modes of FIGS. 4~7, and the practical shift region shown in FIG. 14 for the low side shift region in the operation modes of FIGS. 17~19. In the operation modes of FIGS. 17~19, the practical shift region is set so as to extend in the overdrive shift region.

As explained above, the front wheel drive torque and rear wheel drive torque are taken out from first carrier C1 and second carrier C2 connected with first and second output shafts Out1 and Out2. With the thus-constructed hybrid transmission, it is possible to achieve the four wheel drive system without requiring another motor and without a newly designed vehicle body floor as in earlier technology.

By operating first and second motor/generators MG1 and MG2 in the motor mode or generator mode as explained before, the hybrid transmission system can achieve a desired shift state in accordance with the engine operating condition, and thereby determine the driving force distribution between first and second output shafts Out1 and Out 2 freely. Therefore, this embodiment can provide four wheel drive technique having higher degrees of freedom, and eliminating the need for distinction between main drive wheels and auxiliary or secondary drive wheels.

FIG. 21 show the front wheel driving force Fr, the rear wheel driving force Rr, and the front and rear driving force ratio Ratio (=Fr/Rr) in a direct power distribution mode (the power generated by one of first and second motor/generator MG1 and MG2 is equal to the power consumed by the other of the first and second motor/generators) in the hybrid transmission of the illustrated embodiment in which first output shaft Out1 is connected to left and right front wheels 33L and 33R, and second output shaft Out2 is connected to left and right rear wheels 36L and 36R. On the low side requiring a greater driving force, the front and rear driving force distribution is controlled in the four wheel drive mode. The tendency of the front wheel drive is increased on the high side. Thus, the hybrid transmission can control the front and rear wheel driving force distribution optimally. Moreover, the hybrid transmission per se can perform the function of a transfer or transfer case without the need for providing a transfer mechanism to the advantage of cost.

The hybrid transmission of this embodiment can readily achieve the rigid four wheel drive system inhibiting a rotational speed difference between first and second output shafts Out1 and Out2, by engaging input element clutch Cin and high clutch H/C, and disengaging low brake L/B when the front and rear wheel speed difference is no allowed, or the rigid four wheel drive is required. There is no need for providing a differential limiting mechanism within the hybrid transmission, to the advantage of cost.

The hybrid transmission according to the illustrated embodiment can provide a wide variety of shift states by operating the first and second motor/generators MG1 and MG2 in the motor mode or the generator mode, and moreover by controlling the connecting state (the disconnected state, reverse enable state and unitary rotatable state) between sun gears S1 and S2 with third planetary gear set G3, and the engagement/disengagement state of input element clutch Cin. Therefore, the hybrid transmission can broaden the range of choice of the gear ratio by selection among various combinations. Moreover, according to the embodiment, it is possible to reduce the size of battery 25 and the sizes of motor/generators MG1 and MG2 as mentioned before.

In the hybrid transmission shown in FIG. 2, first sun gear S1 is connected, through the gear system of G4, and gears 15 and 16, with first output shaft Out1, and carrier C2 of second planetary gear set G2 is connected with second output shaft Out2 which is coaxial with second carrier C2. Therefore, one of transmission outputs can be taken out axially (to the rear of the vehicle in the illustrated example) through second output shaft Out2 extending along the main common axis of the hybrid transmission, whereas the other of the transmission outputs can be taken out sideways to the left and right sides of the hybrid transmission or to the upper and lower sides of the hybrid transmission, through first output shaft Out1 which is parallel to the main common axis of the hybrid transmission, to the advantage of power distribution in many cases.

First and second motor/generators MG1 and MG2 are formed in a coaxial unitary structure, and arranged coaxially between engine ENG and the planetary gear set G4 (G1) closest to engine ENG. The coaxial structure of MG1 and MG2 can be installed compactly in a vehicle.

In the example shown in FIG. 2, the input shaft (In) and the second output shaft (Out2) are aligned so as to form a common axis on which the first, second, third and fourth planetary gear sets, and the first and second rotors (12ro, 12ri) are mounted coaxially; and the first output shaft (Out1) is parallel to the common axis. In the example shown in FIG. 2, the electric rotary machine (12) including the first and second rotors (12ro and 12ri), the fourth planetary gear set (G4) and the first planetary gear set (G1) are rotatably mounted on the input shaft (In); and the fourth planetary gear set (G4) is located axially between the electric rotary machine (12) and the first planetary gear set (G1). The second and third planetary gear sets (G2, G3) are rotatably mounted on the second output shaft (Out2); and the second planetary gear set (G2) is located axially between the first planetary gear set (G1) and the third planetary gear set (G3). In the example shown in FIG. 2, there are provided, axially between the first and second differential devices (G1, G2), a first connecting portion connecting first carrier C1 with fourth sun gear S4, a second connecting portion connecting first ring gear R1 with outer rotor 12ro, a third connecting portion connecting second ring gear R2 with input shaft In, a fourth connecting portion connecting second carrier C2 with second output shaft Out2. The second and third connecting portions are located axially between the first and fourth connecting portions.

In the illustrated embodiment, input element clutch Cin can serve as first selective engaging means for connecting the first rotating element of the first differential device and the first rotating element of the second differential device; the input shaft In can serve as input means for inputting an input rotation to the first rotating element of the second differential device; first output shaft Out1 and fourth planetary gear set G4 can serve as first output means for taking out a first output of the hybrid transmission from a first output element which is one of the first rotating elements of the first and second differential devices; second output shaft Out2 can serve as second output means for taking out a second output of the hybrid transmission from the second rotating element of the second differential device; outer rotor 12ro at least can serve as first electric means for converting electric energy into mechanical energy to drive the second rotating element of the first differential device and for converting mechanical energy from the second rotating element of the first differential device into electric energy; inner rotor 12ri at least can serve as second electric means for converting electric energy into mechanical energy to drive the third rotating element of the first differential device, and for converting mechanical energy of the third rotating element of the first differential device into electric energy; and third planetary gear set G3 at least can serve as selecting means for putting a connecting state between the third rotating element of the first differential device and the third rotating element of the second differential device, selectively in one of a disconnect state, a reverse enable state and a unitary rotatable state.

This application is based on a prior Japanese Patent Application No. 2004-271535 filed in Japan on Sep. 17, 2004. The entire contents of this Japanese Patent Application No. 2004-271535 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hybrid transmission comprising:
    first and second differential devices each including first, second and third rotating elements so arranged that a rotating condition of one of the rotating elements is determined if the rotating conditions of the other two elements are determined;
    an input element clutch connecting the first rotating element of the first differential device and the first rotating element of the second differential device;
    an input member adapted to be connected with an engine and connected with the first rotating element of the second differential device;
    a first output member connected with a first output element which is one of the first rotating elements of the first and second differential devices;
    a second output member connected with a second output element which is the second rotating element of the second differential device;
    a first motor/generator connected with the second rotating element of the first differential device;
    a second motor/generator connected with the third rotating element of the first differential device; and
    a select device arranged to put a connecting state between the third rotating element of the first differential device and the third rotating element of the second differential device, selectively in one of a disconnect state, a reverse enable state and a unitary rotatable state.

2. The hybrid transmission as claimed in claim 1, wherein a controller is configured to select a high speed select mode by engaging the input element clutch and controlling the connecting state between the third rotating elements of the first and second differential devices in the disconnect state; a low speed select mode by disengaging the input element clutch and controlling the connecting state between the third rotating elements of the first and second differential devices in the reverse enable state; and an overdrive select mode by disengaging the input element clutch and controlling the connecting state between the third rotating elements of the first and second differential devices in the unitary rotatable state.

3. The hybrid transmission as claimed in claim 1, wherein the hybrid transmission is put in a rigid four wheel drive state in which the first and second output members rotate as a unit when the input element clutch is engaged, and the connecting state is in the unitary rotatable state.

4. The hybrid transmission as claimed in claim 1, wherein the first output member is adapted to be connected with left and right front wheels of a vehicle, and the second output member is adapted to be connected with left and right rear wheels of the vehicle.

5. The hybrid transmission as claimed in claim 1, wherein the select device includes a third differential device having first, second and third rotating elements; a low brake arranged to hold one of the first, second and third elements of the third differential device to achieve the reverse enable state between the third elements of the first and second differential devices; and a high clutch arranged to connect two of the first, second and third elements of the third differential device to achieve the unitary rotatable state between the third elements of the first and second differential devices.

6. The hybrid transmission as claimed in claim 1, wherein the hybrid transmission further comprises a parallel gear set connected between the first output member and the first output element which is one of the first rotating elements of the first and second differential devices.

7. The hybrid transmission as claimed in claim 6, wherein the parallel gear set includes a fourth differential device coaxial with the first differential device, and a gear on a counter shaft parallel to a common axis of the first and fourth differential devices; and the fourth differential device includes a first rotating element connected with the first element of the first differential device, a second rotating element engaging with the gear on the counter shaft, and a third rotating element connected with the second motor/generator and the third rotating element of the first differential device.

8. The hybrid transmission as claimed in claim 7, wherein the fourth differential device, the first differential device, the second differential device, and the third differential device are arranged coaxially in a row in an order of the fourth, first, second and third differential devices, from an end closer to the engine.

9. The hybrid transmission as claimed in claim 8, wherein
    the first differential device is a first planetary gear set including a first carrier which serves as the first rotating element of the first differential device, and which is connected with the first rotating element of the second differential device through the input element clutch, a first ring gear which serves as the second rotating element of the first differential device and which is connected with the first motor/generator, and a first sun gear which serves as the third rotating element of the first differential device and which is connected with the second motor/generator; and
    the second differential device is a second planetary gear set including a second ring gear which serves as the first rotating element of the second differential device, which is connected with the input member and which is connected with the first rotating element of the first differential device through the input element clutch, a second carrier which serves as the second rotating element of the second differential device and which is connected with the second output member, and a second sun gear which serves as the third rotating element of the second differential device and which is connected with the third rotating element of the first differential device through the select device.

10. The hybrid transmission as claimed in claim 9,
    wherein the third differential device is a third planetary gear set including a third sun gear which serves as the first rotating element of the third differential device and which is connected with the second sun gear, a third ring gear which serves as the second rotating element of the third differential device and which is connected with the first sun gear, and a third carrier which serves as the third rotating element of the third differential device and which is connected with a low brake; and wherein the fourth differential device is a fourth planetary gear set including a fourth sun gear which serves as the first rotating element of the fourth differential device and which is connected with the first carrier, a fourth ring gear which serves as the second rotating element of the fourth differential device and which is engaged with the gear on the counter shaft, and a fourth carrier which serves as the third rotating element of the fourth differential device and which is connected with the second motor/generator and the first sun gear;

wherein the first output member is a first output shaft which is parallel to the counter shaft and which is drivingly connected with the fourth ring gear through the gear on the counter shaft and a gear on the first output shaft;

wherein the second output member is a second output shaft connected coaxially with the second carrier;

wherein each of the first, second and third planetary gear sets is a single-pinion planetary gear set, and the fourth planetary gear set is a double-pinion planetary gear set; and wherein the first output member is connected with the first carrier serving as the first output element.

11. A hybrid transmission system comprising:
the hybrid transmission as claimed in claim 1; and
a controller configured to control an operating mode of each motor/generator between a motor mode and a generator mode, an engagement state of the input element clutch, and the connecting state between the third rotating element of the first differential device and the third rotating element of the second differential device.

12. A hybrid vehicle comprising:
the hybrid transmission as claimed in claim 1;
the engine connected with the input member;
front drive wheels connected drivingly with one of the first and second output members; and
rear drive wheels connected drivingly with the other of the first and second output members.

13. A hybrid transmission comprising:
a first planetary gear set including a first sun gear, a first planet carrier and a first ring gear;
a second planetary gear set including a second sun gear, a second planet carrier and a second ring gear;
an input element clutch connecting the first carrier and the second ring gear;
an input shaft adapted to be connected with an engine and connected with the second ring gear;
a first output shaft which is adapted to be connected with first drive wheels of a vehicle and which is connected with one of the first carrier and the second ring gear;
a second output shaft which is adapted to be connected with second drive wheels of the vehicle and which is connected with the second carrier;
an electric rotary machine including a first rotor which forms a first motor/generator and which is connected with the first ring gear, and a second rotor which forms a second motor/generator and which is connected with the first sun gear;
a third planetary gear set including a third sun gear connected with the second sun gear, a third ring gear connected with the first sun gear, and a third planet carrier;

a high clutch arranged to connect the third sun gear and the third ring gear selectively; and
a low brake arranged to hold the third carrier selectively.

14. The hybrid transmission as claimed in claim 13, wherein the hybrid transmission further comprises a fourth planetary gear set including a fourth sun gear connected with the first carrier, a fourth carrier through which the first sun gear is connected with the second rotor, and a fourth ring gear connected with the first output shaft.

15. The hybrid vehicle as claimed in claim 14, wherein the input shaft and the second output shaft are aligned so as to form a common axis on which the first, second, third and fourth planetary gear sets, and the first and second rotors are mounted coaxially; the first output shaft is parallel to the common axis; the electric rotary machine, the fourth planetary gear set and the first planetary gear set are rotatably mounted on the input shaft; the fourth planetary gear set is located axially between the electric rotary machine and the first planetary gear set; the second and third planetary gear sets are rotatably mounted on the second output shaft; and the second planetary gear set is located axially between the first planetary gear set and the third planetary gear set.

16. A hybrid transmission comprising:
a first differential device including first, second and third rotating elements so arranged that a rotating condition of one of the rotating elements is determined if the rotating conditions of the other two elements are determined;
a second differential device including first, second and third rotating elements so arranged that a rotating condition of one of the rotating elements is determined if the rotating conditions of the other two elements are determined;
first selective engaging means for connecting the first rotating element of the first differential device and the first rotating element of the second differential device;
input means for inputting an input rotation to the first rotating element of the second differential device;
first output means for taking out a first output of the hybrid transmission from one of the first rotating elements of the first and second differential devices;
second output means for taking out a second output of the hybrid transmission from the second rotating element of the second differential device;
first electric means for converting electric energy into mechanical energy to drive the second rotating element of the first differential device and for converting mechanical energy from the second rotating element of the first differential device into electric energy;
second electric means for converting electric energy into mechanical energy to drive the third rotating element of the first differential device, and for converting mechanical energy of the third rotating element of the first differential device into electric energy; and
selecting means for putting a connecting state between the third rotating element of the first differential device and the third rotating element of the second differential device, selectively in one of a disconnect state, a reverse enable state and a unitary rotatable state.

* * * * *